US011400816B2

(12) United States Patent
Liu et al.

(10) Patent No.: US 11,400,816 B2
(45) Date of Patent: Aug. 2, 2022

(54) BRAKE ASSISTANCE SYSTEM AND BRAKE METHOD

(71) Applicant: Huawei Technologies Co., Ltd., Shenzhen (CN)

(72) Inventors: Fengyu Liu, Shanghai (CN); Zhuofan Ying, Shanghai (CN); Xiaokang Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/339,543

(22) Filed: Jun. 4, 2021

(65) Prior Publication Data

US 2021/0291665 A1    Sep. 23, 2021

Related U.S. Application Data

(63) Continuation of application No. PCT/CN2020/079771, filed on Mar. 17, 2020.

(30) Foreign Application Priority Data

Jun. 30, 2019    (CN) .......................... 201910581690.7

(51) Int. Cl.
    *B60L 7/26*    (2006.01)
    *B60T 8/171*   (2006.01)
    (Continued)

(52) U.S. Cl.
    CPC ................. *B60L 7/26* (2013.01); *B60T 8/171* (2013.01); *B60T 8/172* (2013.01); *B60T 8/92* (2013.01);
    (Continued)

(58) Field of Classification Search
    CPC . B60L 7/26; B60L 58/12; B60T 8/171; B60T 8/172; B60T 8/92; B60T 13/586;
    (Continued)

(56) References Cited

U.S. PATENT DOCUMENTS 4,395,883 A * 8/1983 Melinat ................. B60T 13/745
                                                          60/545
5,706,918 A * 1/1998 Redelman ............... B60T 13/22
                                                          188/106 F
(Continued)

FOREIGN PATENT DOCUMENTS

CN        102050107 A     5/2011
CN        103754206 A     4/2014
(Continued)

*Primary Examiner* — Pamela Rodriguez
(74) *Attorney, Agent, or Firm* — Conley Rose, P.C.

(57) ABSTRACT

A brake assistance system comprising a brake pedal, a booster motor, a simulation motor, a planetary row coupling node, and a brake master cylinder, where the brake master cylinder is configured to provide a braking force for the vehicle. The brake pedal, the booster motor, and the simulation motor are separately coupled to the planetary row coupling node. The planetary row coupling node is configured to convert a torque of the brake pedal, a torque output (Continued)

by the booster motor, and a torque output by the simulation motor into an acting force acting on a piston rod in the brake master cylinder.

20 Claims, 20 Drawing Sheets

(51) Int. Cl.

| | | |
|---|---|---|
| *B60T 8/172* | (2006.01) | |
| *B60T 8/92* | (2006.01) | |
| *B60T 13/58* | (2006.01) | |
| *B60T 13/74* | (2006.01) | |
| *B60T 17/22* | (2006.01) | |
| *F16H 37/06* | (2006.01) | |
| *B60L 58/12* | (2019.01) | |
| *F16H 1/16* | (2006.01) | |
| *F16H 1/28* | (2006.01) | |
| *F16H 19/04* | (2006.01) | |

(52) U.S. Cl.
CPC .......... *B60T 13/586* (2013.01); *B60T 13/745* (2013.01); *B60T 17/221* (2013.01); *F16H 37/065* (2013.01); *B60L 58/12* (2019.02); *B60T 2201/03* (2013.01); *B60T 2220/04* (2013.01); *B60T 2250/00* (2013.01); *B60T 2270/604* (2013.01); *F16H 1/16* (2013.01); *F16H 1/28* (2013.01); *F16H 19/04* (2013.01)

(58) Field of Classification Search
CPC .. B60T 13/745; B60T 17/221; B60T 2201/03; B60T 2250/00; B60T 2220/04; B60T 2270/604; F16H 37/065; F16H 1/16; F16H 1/28; F16H 19/04
See application file for complete search history.

(56) References Cited

U.S. PATENT DOCUMENTS

| | | | | |
|---|---|---|---|---|
| 8,069,662 | B1* | 12/2011 | Albert | ................... B60T 13/745 |
| | | | | 60/545 |
| 9,925,968 | B2* | 3/2018 | Cann | ..................... B60T 13/745 |
| 2001/0039230 | A1* | 11/2001 | Severinsky | .............. B60K 1/02 |
| | | | | 477/3 |
| 2008/0203812 | A1 | 8/2008 | Niino et al. | |
| 2011/0152027 | A1* | 6/2011 | Ohno | ..................... B62D 5/008 |
| | | | | 475/150 |
| 2012/0192556 | A1* | 8/2012 | Verhagen | .............. B60T 8/4072 |
| | | | | 60/585 |
| 2016/0257297 | A1* | 9/2016 | Oshiumi | ................. B60L 15/20 |
| 2016/0339890 | A1* | 11/2016 | Cann | ..................... B60T 13/745 |
| 2018/0093653 | A1 | 4/2018 | Bull et al. | |

FOREIGN PATENT DOCUMENTS

| | | |
|---|---|---|
| CN | 103754209 A | 4/2014 |
| CN | 104709096 A | 6/2015 |
| CN | 204567642 U | 8/2015 |
| CN | 103754208 B | 6/2016 |
| CN | 105667485 A | 6/2016 |
| CN | 105857283 A | 8/2016 |
| CN | 106585602 A | 4/2017 |
| CN | 107031597 A | 8/2017 |
| CN | 107226076 A | 10/2017 |
| CN | 206598841 U | 10/2017 |
| CN | 107757591 A | 3/2018 |
| CN | 108482346 A | 9/2018 |
| JP | 2005112025 A | 4/2005 |
| JP | 2016216037 A | 12/2016 |
| WO | 2018062001 A1 | 4/2018 |

\* cited by examiner

Table 1 Different working modes of the brake system

| Working mode | | Brake requirement | | Working condition | | Working status | | | |
|---|---|---|---|---|---|---|---|---|---|
| | | Brake assistance system | Motor braking | Brake requirement | SOC status | Booster motor | Simulation motor | Brake pedal | Brake master cylinder |
| 1 Assisted braking | Assisted braking (pure brake assistance system) | √ | X | — | High | Position control | Torque control | Stepped on | Compression |
| | Assisted braking (motor braking + brake assistance braking) | √ | √ | High | Low | Position control | Torque control | Stepped on | Compression |
| | Assisted braking (pure motor braking) | X | √ | Low | Low | Position control | Torque control | Stepped on | Original position |
| 2 Main active braking | Active braking (pure brake assistance system) | √ | X | — | High | Position control | Torque control | Original position | Compression |
| | Active braking (motor braking + brake assistance system braking) | √ | √ | High | Low | Position control | Torque control | Original position | Compression |
| | Active braking (pure motor braking) | X | √ | Low | Low | Off | Off | Original position | Original position |

FIG. 18

BRAKE ASSISTANCE SYSTEM AND BRAKE METHOD

CROSS-REFERENCE TO RELATED APPLICATIONS

This application is a continuation of International Patent Application No. PCT/CN2020/079771 filed on Mar. 17, 2020, which claims priority to Chinese Patent Application No. 201910581690.7 filed on Jun. 30, 2019. The disclosures of the aforementioned applications are hereby incorporated by reference in their entireties.

TECHNICAL FIELD

This application relates to the field of automobile technologies, and in particular, to a brake assistance system, a brake method, and an electric vehicle.

BACKGROUND

New energy vehicles are a rapidly growing type of vehicle today. Driven by motors, the new energy vehicles have braking systems different from those of the existing gasoline energy vehicles. In a braking system of a new energy vehicle shown in FIG. 1, when a driver steps on a brake pedal, vehicle brake is transferred through two paths as follows: (1) A braking force generated by the driver stepping on the brake pedal is transferred to a hydraulic braking system through a brake assistance mechanism, and a brake master cylinder, a hydraulic pipeline, and a brake caliper in the hydraulic braking system apply the braking force to wheels, and (2) A controller controls motor brake. A drive motor in the motor brake generates a reverse torque and the reverse torque is directly applied to the wheels through transmission components to implement braking.

FIG. 2 shows a brake apparatus in the other approaches. The brake apparatus includes a brake pedal 1, an actuator motor 2, and an actuator motor 3 that are connected in series. The brake pedal 1 is connected to the actuator motor 2, and the actuator motor 3 is connected to the brake master cylinder 4. Intermediate shafts of the actuator motor 2 and the actuator motor 3 are not in direct contact, and there is a gap 5. Therefore, during normal operation, motions of the two actuator motors are independent of each other. The actuator motor 2 simulates resistance of the brake pedal 1, and the actuator motor 3 drives the brake master cylinder 4 to build up pressure for hydraulic braking. Therefore, the system achieves decoupling between the pedal 1 and the brake master cylinder 4. In addition, when the actuator motor 2 fails, the brake pedal 1 can still directly drive the brake master cylinder 4 through the gap 5 between the two actuator motors to generate a force with some strength for hydraulic braking. However, because the two actuator motors are connected end to end, the system is relatively long, and requirements for a space layout and mounting dimensions are relatively high. In addition, the actuator motor 2 is always used as resistance to simulate a pedal force, and the brake master cylinder 4 can be driven only by the actuator motor 3. This has relatively high requirements for power, a torque, and the like of the drive motor 3.

SUMMARY

This application provides a brake assistance system, a brake method, and an electric vehicle, to improve a brake assistance system of a motor.

According to a first aspect, a brake assistance system is provided, and the brake assistance system is applied to an electric vehicle driven by a motor for braking. The brake assistance system includes a brake pedal, a booster motor, a simulation motor, a planetary row coupling node, and a brake master cylinder. The brake master cylinder is configured to provide a braking force for the vehicle. The brake pedal, the booster motor, and the simulation motor serve as input mechanisms of the braking force. The planetary row coupling node is configured to drive a brake master cylinder to work with the force generated by the input mechanisms. In a specific connection, the brake pedal, the booster motor, and the simulation motor are separately connected to the planetary row coupling node. The planetary row coupling node is configured to convert a torque of the brake pedal, a torque output by the booster motor, and a torque output by the simulation motor into an acting force acting on a piston rod in the brake master cylinder. It can be learned from the foregoing description that, the planetary row coupling node is disposed, so that both the torque output by the simulation motor and the torque output by the booster motor are used as the force for driving the piston rod of the brake master cylinder. This can reduce an output power requirement on a single motor. In addition, when two motors are used to drive the brake master cylinder at the same time, if one motor fails, the other motor can be used for braking, so that reliability of the entire brake assistance system is improved.

In a specific implementable solution, the planetary row coupling node includes a planetary gear mechanism, a first transmission mechanism, a second transmission mechanism, and a third transmission mechanism. The brake pedal drives, by using the first transmission mechanism, a ring gear of the planetary gear mechanism to rotate. The booster motor drives, by using the second transmission mechanism, a planet carrier of the planetary gear mechanism to rotate. The simulation motor is connected to a sun gear of the planetary gear mechanism and is configured to drive the sun gear to rotate. The planet carrier drives, by using the third transmission mechanism, the piston rod to move linearly. The planetary gear mechanism is set to be engaged with the three transmission mechanisms, so that outputs of the brake pedal, the booster motor, and the simulation motor act on the brake master cylinder. A planetary row gear mechanism is used, so that the brake pedal can be decoupled from the brake master cylinder, that is, the brake pedal can implement different braking forces for the brake master cylinder at a same position. In this case, the brake master cylinder can be adjusted based on a requirement, thereby implementing electro-hydraulic decoupling.

In a specific implementable solution, the first transmission mechanism includes a first rack connected to the brake pedal and a first gear meshing with the first rack. The first gear and the ring gear are fixedly connected and coaxially disposed. A force of the brake pedal is transferred to the planetary gear mechanism through engagement between the first gear and the first rack.

In a specific implementable solution, the second transmission mechanism includes a worm connected to the booster motor and a worm gear meshing with the worm, and the worm gear and the planet carrier are fixedly connected and coaxially disposed. The second transmission mechanism composed of the worm gear and the worm is used to apply the torque output by the booster motor to the brake master cylinder.

In a specific implementable solution, the second transmission mechanism includes a first bevel gear connected to the booster motor and a second bevel gear fixedly connected to the planet carrier, and the first bevel gear meshes with the second bevel gear. A bevel gear set is used to apply the torque of the booster motor to the brake master cylinder.

In a specific implementable solution, the third transmission structure includes a second rack fixedly connected to the piston rod of the brake master cylinder and a second gear meshing with the second rack, and the second gear and the planet carrier are fixedly connected and coaxially disposed. Through specified engagement between the second rack and the second gear, a torque of the planetary gear mechanism is converted into a linear motion that pushes the piston rod of the brake master cylinder.

In a specific implementable solution, the planetary row coupling node further includes a limiting apparatus configured to limit rotation of the sun gear to a specified angle. The planetary row coupling node is used to prevent the limiting apparatus from providing a support force for the sun gear after the simulation motor fails.

In a specific implementable solution, the planetary row coupling node further includes a reset spring configured to drive the sun gear back to an initial position. The sun gear is driven back to the initial position by the specified reset spring.

In a specific implementable solution, the brake assistance system further includes a first detection apparatus configured to detect brake information of the electric vehicle, a second detection apparatus configured to detect a battery level of a battery of the electric vehicle, and a control apparatus configured to obtain a brake requirement of the electric vehicle based on the brake information of the electric vehicle that is detected by the first detection apparatus, and determine a braking force allocation proportion of each of the motor and the brake master cylinder in the electric vehicle based on the brake requirement of the electric vehicle and the battery level of the battery of the electric vehicle that is obtained by the second detection apparatus, obtain a first torque of the simulation motor based on the obtained brake information of the electric vehicle, and determine a second torque of the booster motor based on the first torque of the simulation motor and the braking force allocation proportion of the brake master cylinder, and control the booster motor and the simulation motor to output the first torque and the second torque respectively. A planetary row gear mechanism is used, so that the brake pedal can be decoupled from the brake master cylinder, that is, the brake pedal can implement different braking forces for the brake master cylinder at a same position. In this case, the brake master cylinder can be adjusted based on a requirement, thereby implementing electro-hydraulic decoupling. In addition, after the brake pedal is decoupled from the brake master cylinder, the control apparatus may select an active braking mode or an assisted braking mode based on a driving status of the electric vehicle.

In a specific implementable solution, the first detection apparatus is a first displacement sensor or an advanced driver-assistance system (ADAS) system of the electric vehicle for detecting a position of the brake pedal. When the first detection apparatus is the first displacement sensor, the brake information of the electric vehicle is the position of the brake pedal.

In a specific implementable solution, the control apparatus is configured to obtain the brake requirement of the electric vehicle based on the position of the brake pedal that is detected by the first displacement sensor and a specified correspondence between the position of the brake pedal and the brake requirement. The brake requirement of the electric vehicle is determined based on the obtained position of the brake pedal.

In a specific implementable solution, the control apparatus is further configured to obtain a rotation angle of the sun gear based on the position of the brake pedal that is detected by the first displacement sensor and the braking force allocation proportion of the brake master cylinder, and obtain a torque of the reset spring to the sun gear based on the rotation angle of the sun gear and an elastic coefficient of the reset spring. Driving of the reset spring to the brake master cylinder is also considered in a brake scheme, so that control accuracy is improved.

In a specific implementable solution, the control apparatus is further configured to obtain a braking force of the brake pedal based on the position of the brake pedal that is detected by the first displacement sensor and a correspondence between the position of the brake pedal and the braking force of the brake pedal. The first torque of the simulation motor that is obtained by the control apparatus based on the obtained brake information of the electric vehicle meets the following formula:

$$T_{b\_trg} = i_1 F_{padel}, \text{ and}$$
$$T_{m\_cmd} = \frac{1}{a} T_{b\_trg} - T_s.$$

where $T_{m\_cmd}$ is the first torque, a represents a gear ratio of the ring gear to the sun gear, $T_s$ is the torque of the reset spring to the sun gear, $T_{b\_trg}$ is the torque of the brake pedal, $F_{padel}$ is the braking force of the brake pedal, and $i_1$ is a speed ratio coefficient of the first gear to the first rack in the first transmission mechanism.

In a specific implementable solution, the second torque of the booster motor that is determined by the control apparatus based on the first torque of the simulation motor and the braking force allocation proportion of the brake master cylinder meets the following formula:

$$T_{c\_trg} = F_{piston\_trg} i_2, \text{ and}$$
$$T_{a\_FF} = T_{c\_trg} - (a+1)(T_{m\_cmd} + T_s),$$

where $F_{piston\_trg}$ is a braking force of the brake master cylinder, $i_2$ is a speed ratio coefficient of the second gear to the second rack in the third transmission mechanism, and $T_{c\_trg}$ is a torque applied by the brake master cylinder to the planet carrier.

$T_{a\_FF}$ is the second torque, $T_{m\_cmd}$ is the first torque, Ts is a torque of the reset spring to the sun gear, and a represents a gear ratio of the ring gear to the sun gear.

In a specific implementable solution, a second displacement sensor configured to detect a displacement of the piston rod of the brake master cylinder is further included.

The control apparatus is further configured to obtain, based on the braking force allocation proportion of the brake master cylinder, a displacement value by which the piston rod of the brake master cylinder needs to move to reach, and when the second displacement sensor detects that the displacement of the piston rod does not reach the displacement value, control the booster motor to drive the piston rod to move to reach the displacement value. In this way, closed-loop control of the booster motor is implemented, so that a braking effect is improved.

In a specific implementable solution, the control apparatus is further configured to when the booster motor or the simulation motor fails, determine, based on the braking force allocation proportion of the brake master cylinder, a third torque of a non-failed simulation motor or a non-failed booster motor, and control the non-failed simulation motor or the non-failed booster motor to output the third torque. When one of the motors fails, another motor can still be used to implement braking, so that reliability of the entire brake assistance system is improved.

In a specific implementable solution, the control apparatus may be further applied when the electric vehicle is in an active braking state. After the brake pedal is stepped on, when it is determined, based on a specified correspondence between the position of the brake pedal and the brake requirement, that the brake requirement provided by the brake pedal is greater than a brake requirement of active braking, the control apparatus uses the brake requirement corresponding to the brake pedal.

According to a second aspect, a brake method for an electric vehicle is provided, and the method includes detecting brake information of the electric vehicle, obtaining a first torque of a simulation motor in the electric vehicle based on the brake information of the electric vehicle, obtaining a brake requirement of the electric vehicle based on the brake information of the electric vehicle, obtaining a battery level of a battery of the electric vehicle, determining a braking force allocation proportion of each of a motor and a brake master cylinder in the electric vehicle based on a driving status of the electric vehicle, the brake requirement of the electric vehicle, and the battery level of the electric vehicle, determining a second torque of the booster motor based on the first torque of the simulation motor and the braking force allocation proportion of the brake master cylinder, and controlling the simulation motor to output the first torque, and controlling the booster motor to output the second torque.

The first torque and the second torque that are respectively output by the simulation motor and the booster motor act on a piston rod in the brake master cylinder in the electric vehicle to move.

In the foregoing technical solution, both the torque output by the simulation motor and the torque output by the booster motor are used as a force for driving the piston rod of the brake master cylinder. This can reduce an output power requirement on a single motor. In addition, when two motors are used to drive the brake master cylinder at the same time, if one motor fails, the other motor can be used for braking, so that reliability of the entire brake assistance system is improved. In addition, an active braking mode or an assisted braking mode may be selected based on the driving status of the electric vehicle. When the electric vehicle is in a self-driving state, the active braking mode may be used. When the electric vehicle is in a human driving state, the assisted braking mode may be used.

In a specific implementable solution, the obtaining a brake requirement of the electric vehicle based on the brake information of the electric vehicle includes obtaining the brake requirement of the electric vehicle based on an ADAS system in the electric vehicle, or detecting a position of a brake pedal in the electric vehicle, and obtaining the brake requirement of the electric vehicle based on the position of the brake pedal and a specified correspondence between the position of the brake pedal and the brake requirement. The brake information of the electric vehicle is obtained in different manners.

In a specific implementable solution, the method further includes obtaining a braking force of the brake pedal based on the position of the brake pedal and the specified correspondence between the position of the brake pedal and the braking force of the brake pedal, and obtaining a rotation angle of a sun gear in the electric vehicle based on the position of the brake pedal and the braking force allocation proportion of the brake master cylinder, and obtaining a torque of a reset spring to the sun gear based on the rotation angle of the sun gear and an elastic coefficient of the reset spring in the electric vehicle.

The sun gear is located in a planetary gear mechanism of a planetary row coupling node in the electric vehicle. The planetary row coupling node is configured to convert the braking force of the brake pedal, the torque of the reset spring to the sun gear, and the first torque and the second torque that are respectively output by the booster motor and the simulation motor into an acting force acting on the piston rod in the brake master cylinder. In this way, the booster motor and the simulation motor are more accurately controlled. A planetary row gear mechanism is used, so that the brake pedal can be decoupled from the brake master cylinder, that is, the brake pedal can implement different braking forces for the brake master cylinder at a same position. In this case, the brake master cylinder can be adjusted based on a requirement, thereby implementing electro-hydraulic decoupling.

In a specific implementable solution, the first torque of the simulation motor that is obtained based on the brake information of the electric vehicle meets the following formula:

$$T_{b\_trg} = i_1 F_{padel}, \text{ and}$$

$$T_{m\_cmd} = \frac{1}{a} T_{b\_trg} - T_s.$$

where $T_{m\_cmd}$ is the first torque, a represents a gear ratio of the ring gear to the sun gear, $T_s$ is the torque of the reset spring to the sun gear, $T_{b\_trg}$ is the torque of the brake pedal, $F_{padel}$ is the braking force of the brake pedal, and $i_1$ is a speed ratio coefficient of the first gear to the first rack in the first transmission mechanism.

Both the ring gear and the first transmission mechanism are disposed in the planetary row coupling node. The first rack is connected to the brake pedal. The first gear meshes with the first rack. The first gear and the ring gear are fixedly connected and coaxially disposed.

In a specific implementable solution, the second torque of the booster motor that is determined based on the first torque of the simulation motor and the braking force allocation proportion of the brake master cylinder meets the following formula:

$$T_{c\_trg} = F_{piston\_trg} \cdot i_2, \text{ and}$$

$$T_{a\_FF} = T_{c\_trg} - (a+1)(T_{m\_cmd} + T_s).$$

$F_{piston\_trg}$ is a braking force of the brake master cylinder, $i_2$ is a speed ratio coefficient of the second gear to the second rack in the third transmission mechanism, and $T_{c\_trg}$ is a torque applied by the brake master cylinder to the planet carrier.

$T_{a\_FF}$ is the second torque, $T_{m\_cmd}$ is the first torque, Ts is a torque of the reset spring to the sun gear, and a represents a gear ratio of the ring gear to the sun gear.

Both the first transmission mechanism and the planet carrier are disposed in the planetary row coupling node. The second rack is fixedly connected to the piston rod of the brake master cylinder. The second rack meshes with the second gear. The second gear and the planet carrier are fixedly connected and coaxially disposed.

In a specific implementable solution, the method further includes detecting a first displacement value of the piston rod of the brake master cylinder, and obtaining, based on a braking force allocation proportion of the brake assistance system, a second displacement value by which the piston rod of the brake master cylinder needs to move to reach, and when the first displacement value does not reach the second displacement value, controlling the booster motor to drive the piston rod to move to reach the second displacement value. In this way, closed-loop control of the booster motor is implemented.

In a specific implementable solution, the method further includes, when the booster motor or the simulation motor fails, determining, based on the braking force allocation proportion of the brake master cylinder, a third torque of a non-failed simulation motor or a non-failed booster motor, and controlling the non-failed simulation motor or the non-failed booster motor to output the third torque. In this way, reliability of the brake assistance system is improved.

In a specific implementable solution, the method further includes, when the electric vehicle is in an active braking state, after the brake pedal is stepped on, when it is determined, based on a specified correspondence between the position of the brake pedal and the brake requirement, that the brake requirement provided by the brake pedal is greater than a brake requirement of active braking, using, by a control apparatus, the brake requirement corresponding to the brake pedal.

According to a third aspect, an electric vehicle is provided. The electric vehicle includes a vehicle body, a battery disposed on the vehicle body, and the brake assistance system according to any one of the foregoing implementations. In the foregoing technical solution, both the torque output by the simulation motor and the torque output by the booster motor are used as a force for driving the piston rod of the brake master cylinder. This can reduce an output power requirement on a single motor. In addition, when two motors are used to drive the brake master cylinder at the same time, if one motor fails, the other motor can be used for braking, so that reliability of the entire brake assistance system is improved.

BRIEF DESCRIPTION OF DRAWINGS

FIG. 18 is a Table of different working modes of the brake system.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise stated, "a plurality of" means two or more than two.

Figure 3A:
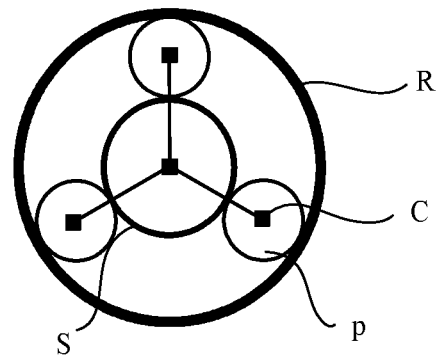
FIG. 3A is a schematic structural diagram of a planetary gear mechanism.
Figure 3B:
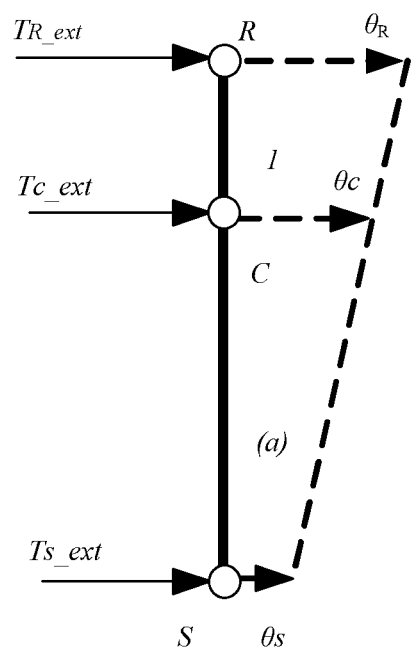
FIG. 3B is an equivalent lever diagram of force analysis of a planetary gear mechanism.

For ease of understanding of the embodiments of this application, the following concepts are first described:

Planetary gear mechanism: As shown in FIG. 3A, the planetary gear mechanism includes a ring gear (R), a planet carrier (C), and a sun gear (S). The planet carrier (C) is rotatably connected to the ring gear (R) by using a planet gear (P). The sun gear (S) is rotatably connected to the planet gear (P). A lever method is often used to analyze a motion and a force of the planetary gear mechanism. As shown in FIG. 3B, in a single planetary gear mechanism, because the ring gear and the sun gear move in opposite directions in a motion relative to the planet carrier, in an equivalent lever diagram, the sun gear and the ring gear are respectively arranged on two sides of the planet carrier. As shown in FIG. 3B, motion angular displacements of three components: the ring gear, the planet carrier, and the sun gear are respectively denoted by $\theta_R$ (ring gear), $\theta_c$ (planet carrier), and $\theta_s$ (sun gear), and received forces are respectively denoted by $T_{R\_ext}$ (ring gear), $T_{C_{ext}}$ (planet carrier), and $T_{S_{ext}}$ (sun gear). The three components have constraint relationships within the planetary gear mechanism, and the constraint relationships can be expressed by the following three formulas:

$$T_{R\_ext} + T_{C_{ext}} + T_{S_{ext}} = 0, \tag{1}$$

$$T_{R_{ext}} = T_{S_{ext}} \cdot a, \text{ and} \tag{2}$$

$$a\theta_R + \theta_s = (1+a)\theta_c. \tag{3}$$

According to the foregoing three formulas, it can be learned that a force and a motion of the planet gear are similar to a force of a lever. Therefore, it is more intuitive to analyze the force and the motion of the planetary gear mechanism by using the lever diagram. An equivalent result is shown in FIG. 3B. A gear ratio of the planetary gear mechanism is represented by a length ratio of the lever, as shown in FIG. 3B. In addition, 1: a is a gear ratio of the ring gear to the sun gear. A rotational motion of the planetary gear mechanism is replaced with a translation of a lever node (a length of a dashed arrow in FIG. 3B), and a torque to which the planetary gear mechanism is subject is replaced with a horizontal force (a solid arrow in FIG. 3B).

Electro-hydraulic braking decoupling (or electro-hydraulic decoupling) implements decoupling control of motor braking and hydraulic braking, improving braking energy recovery efficiency of an entire vehicle.

Figure 1:
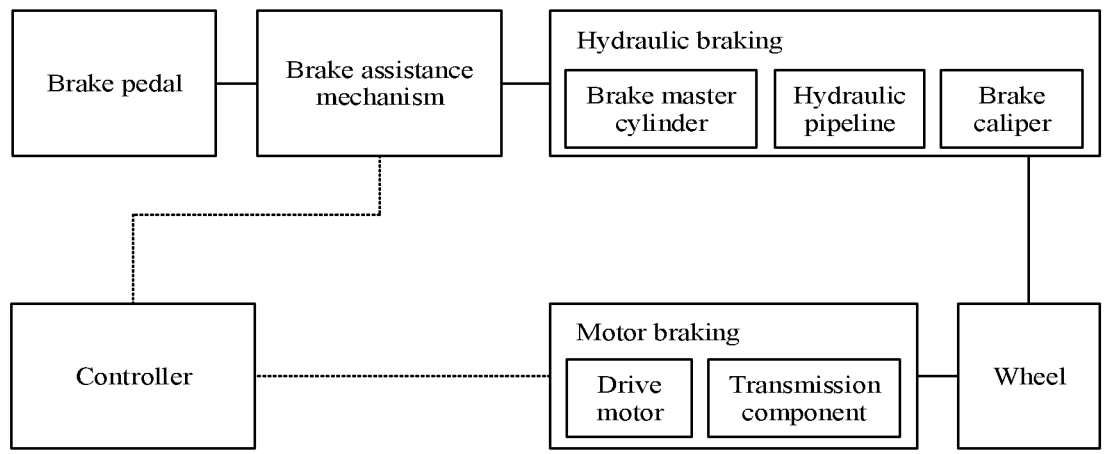
FIG. 1 is a flowchart of electric vehicle braking.
Figure 2:
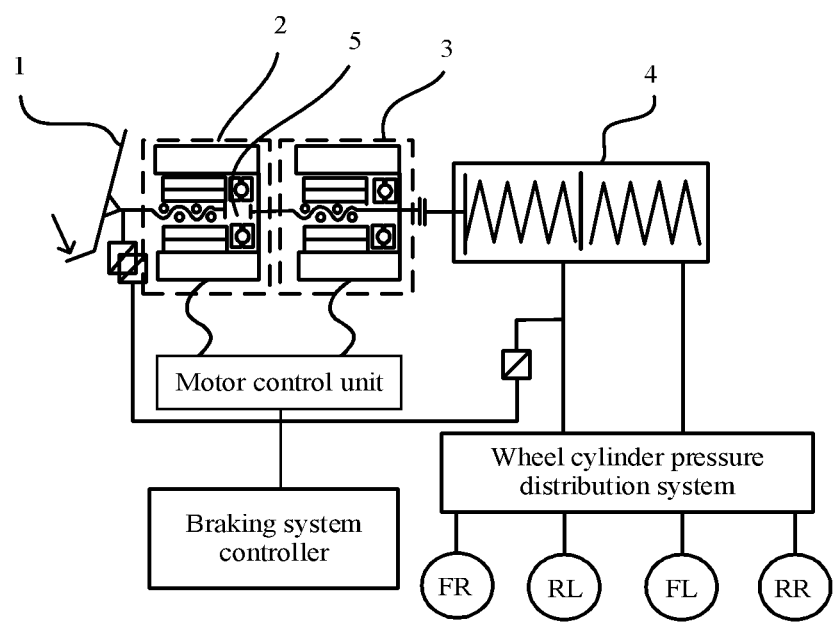
FIG. 2 is a schematic structural diagram of a brake assistance system.

For ease of understanding of a brake assistance system provided in the embodiments of this application, an electric vehicle is first described. The electric vehicle includes a battery and a motor connected to the battery. The motor is a drive motor, and is configured to provide power for the electric vehicle. In addition, during braking, the motor may also be driven by a wheel to rotate, and the motor is used as a generator to supply power to the battery, to recover kinetic energy. In addition, the electric vehicle further has a dedicated hydraulic braking system. FIG. 1 shows two different paths during braking of a vehicle in the other approaches. A first path is that a braking force acts on wheels by using a brake assistance mechanism, a hydraulic braking system, and a braking caliper. A second path is that a motor is driven to generate a reverse torque, directly acting on the wheels to implement braking. The brake assistance system provided in the embodiments of this application is a mechanism that performs braking by using the first path. The following describes in detail the brake assistance system provided in the embodiments of this application with reference to the accompanying drawings and specific embodiments.

Figure 4:
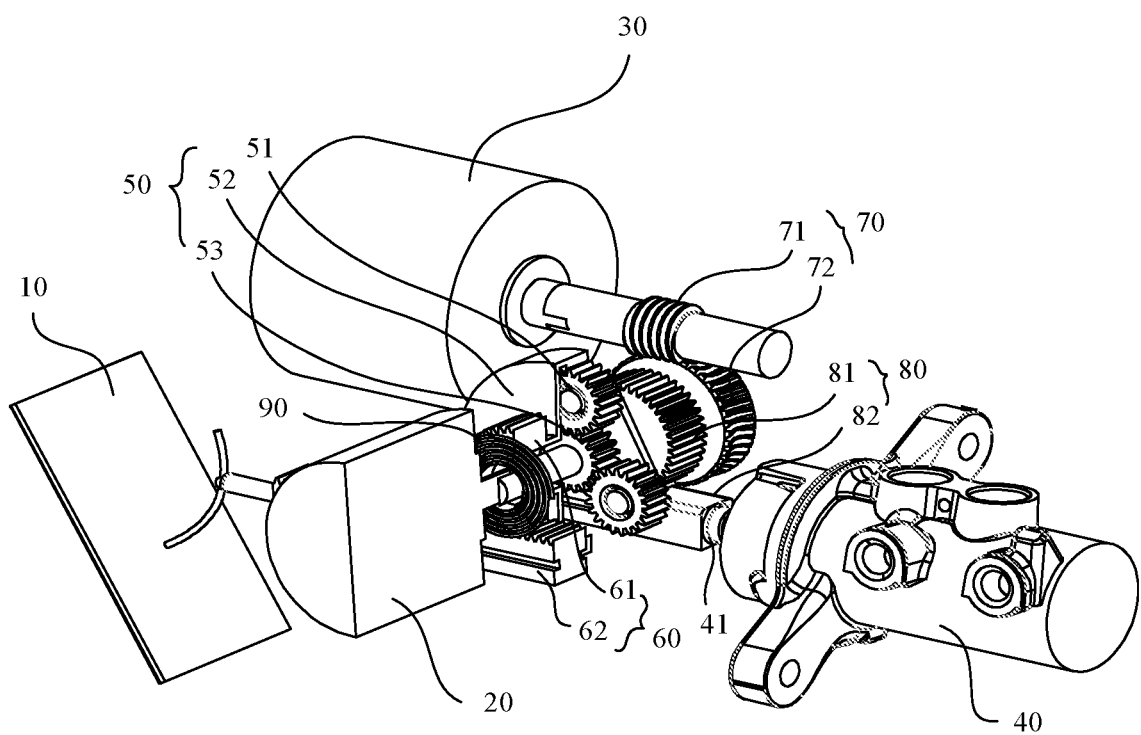
FIG. 4 is a schematic structural diagram of a brake assistance system according to an embodiment of this application.
Figure 5:
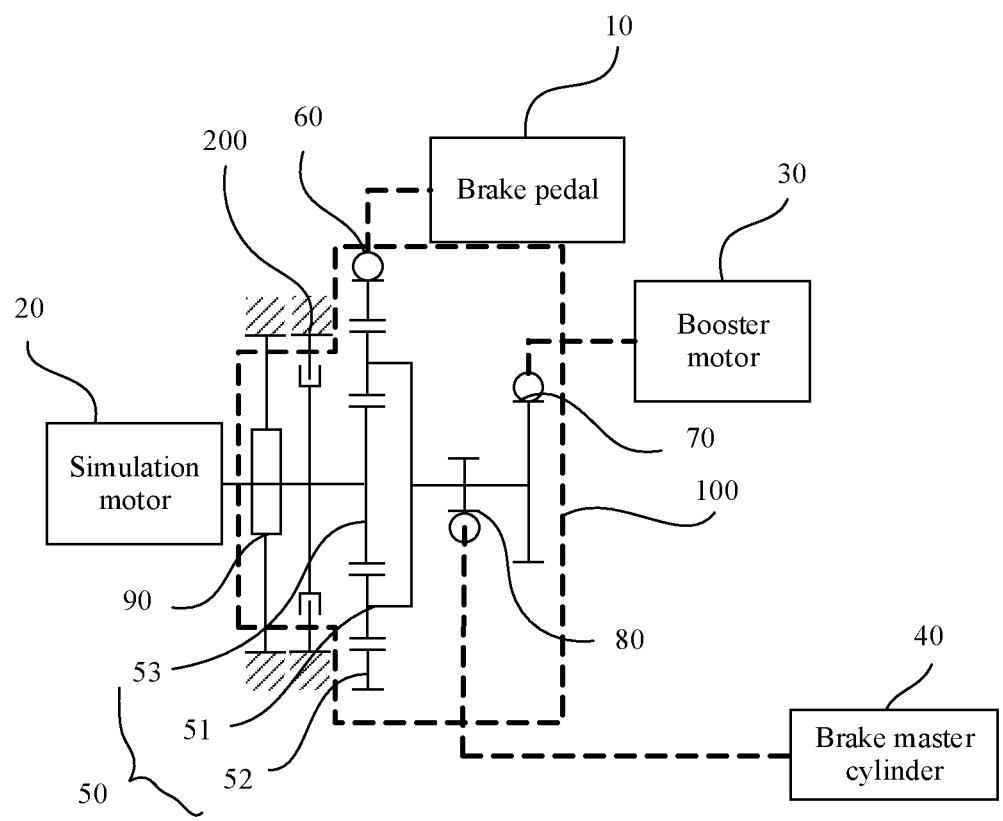
FIG. 5 is a principle diagram of a brake assistance system according to an embodiment of this application.

Referring to FIG. 4 and FIG. 5, FIG. 4 is a schematic structural diagram of a brake assistance system according to an embodiment of this application, and FIG. 5 is a principle diagram of a brake assistance system according to an embodiment of this application. The brake assistance system provided in this embodiment of this application includes a brake pedal 10, a simulation motor 20, and a booster motor 30. The brake pedal 10 is a structure used by a driver to step on when the driver performs a braking operation, and is the same as the brake pedal 10 in the other approaches. The simulation motor 20 is configured to simulate a pedal force of the brake pedal 10 and provide different pedal forces based on a stepping depth of the brake pedal 10. The booster motor 30 is configured to assist in driving a brake master cylinder 40 to perform braking. The brake assistance system further includes the brake master cylinder 40, and the electric vehicle is braked by using the brake master cylinder 40. The brake pedal 10, the simulation motor 20, and the booster motor 30 each apply a force to the brake master cylinder 40 by connecting to a planetary row coupling node 100, and then the brake master cylinder 40 brakes the electric vehicle. The following describes in detail a specific connection method of the forgoing components.

Figure 6:
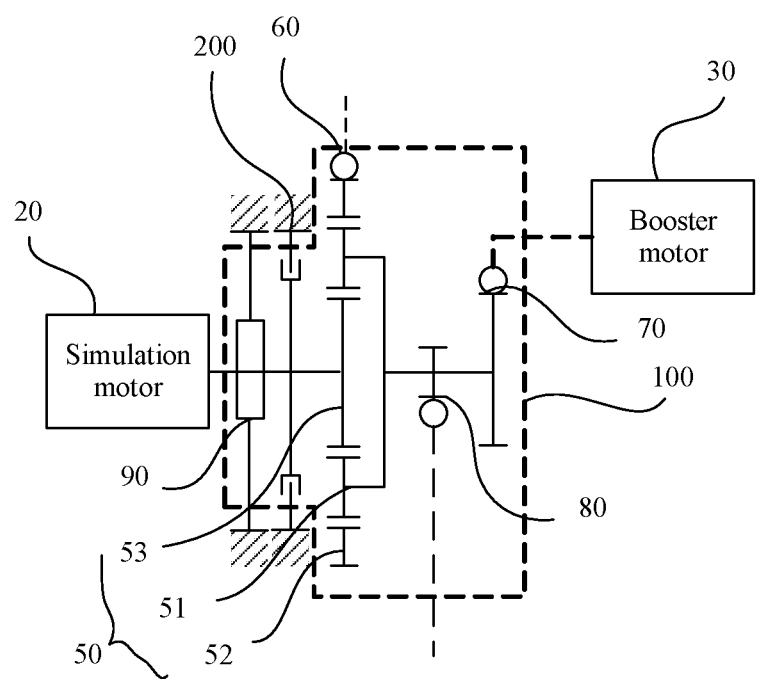
FIG. 6 is a principle diagram of a planetary row coupling node according to an embodiment of this application.

Referring to FIG. 4 and FIG. 6, FIG. 6 is a principle diagram of a planetary row coupling node according to an embodiment of this application. The planetary row coupling node 100 in this embodiment of this application includes a first transmission mechanism 60, a second transmission mechanism 70, a third transmission mechanism 80, and a planetary gear mechanism 50. The planetary gear mechanism 50 is shown in FIG. 3A, and includes a ring gear 52, a planet carrier 51, and a sun gear 53. Still referring to FIG. 4 and FIG. 6, the brake pedal 10 is connected to the ring gear 52 of the planetary gear mechanism 50 by using the first transmission mechanism 60, and drives, by using the first transmission mechanism 60, the ring gear 52 to rotate. As shown in FIG. 4, the first transmission mechanism 60 may be a gear-rack mechanism, and includes a first rack 62 connected to the brake pedal 10 and a first gear 61 meshing with the first rack 62. The first gear 61 and the ring gear 52 are fixedly connected and coaxially disposed. After the brake pedal 10 is stepped on, the brake pedal 10 rotates and drives the first rack 62 to move linearly, and the first rack 62 drives the first gear 61 to rotate, thereby driving the ring gear 52 to rotate. When being stepped on, the brake pedal 10 generates a torque to the planetary gear mechanism 50, and the torque is referred to as a torque of the brake pedal 10. It should be understood that FIG. 4 shows only that the gear-rack mechanism is used as the first transmission mechanism 60. However, the first transmission mechanism 60 provided in this embodiment of this application is not limited to the gear-rack mechanism, and another known transmission mechanism that can convert linear motion into rotation may also be used.

Still referring to FIG. 4 and FIG. 6, a direction of an axis of the booster motor 30 is perpendicular to a direction of an axis of the planetary gear mechanism 50. When the axis of the booster motor 30 is perpendicular to the axis of the planetary gear mechanism 50, as shown in FIG. 4, space occupied by the brake assistance system in the direction of the axis of the planetary gear mechanism 50 can be reduced. This can reduce space occupied by the entire brake assistance system. The booster motor 30 is connected to the planet carrier 51 of the planetary gear mechanism 50 by using the second transmission mechanism 70. The second transmission mechanism 70 may be a mechanism including a worm gear 72 and a worm gear 71. As shown in FIG. 4, the booster motor 30 is connected to the worm gear 71, the planet carrier 51 and the worm gear 72 are fixedly connected and coaxially disposed, and the worm gear 71 meshes with the worm gear 72. During operation of the booster motor 30, an output shaft of the booster motor 30 is fixedly connected to the worm 71, the worm 71 is driven to rotate when the output shaft rotates, and the worm 71 drives the worm wheel 72 to rotate, to drive the planet carrier 51 to rotate. In addition, the booster motor 30 generates a torque to the planet carrier 51, and the torque is referred to as a torque of the booster motor 30. The second transmission mechanism 70 provided in this embodiment of this application is not limited to the foregoing mechanism including the worm gear 72 and the worm gear 71. For example, the second transmission mechanism 70 is a bevel gear set. When the bevel gear set is used, a first bevel gear of the bevel gear set is connected to the booster motor 30, a second bevel gear and the planet carrier 51 are fixedly connected and coaxially disposed, and the first bevel gear meshes with the second bevel gear. Similarly, the booster motor 30 can also be used to drive the planet carrier 51 to rotate. When the bevel gear is used for engagement, there may be more options for setting a position of the booster motor 30. For example, when bevel gears with different taper degrees are selected, there may be different angles between the axis of the booster motor 30 and the axis of the planetary gear mechanism 50, and the selection is more flexible. Alternatively, when the axis of the booster motor 30 is the same as or parallel to the axis of the planetary gear mechanism 50, another common transmission mechanism may be used to drive the planet carrier 51 to rotate.

Still referring to FIG. 4 and FIG. 6, an axis of the simulation motor 20 is the same as an axis of the planetary gear mechanism 50, and the simulation motor 20 is connected to the sun gear 53 of the planetary gear mechanism 50 and is configured to drive the sun gear 53 to rotate. During operation of the simulation motor 20, an output shaft of the simulation motor 20 is directly connected to the sun gear 53, to directly drive the sun gear 53 to rotate. A torque of the simulation motor 20 is a torque directly acting on the planetary gear mechanism 50. When the axis of the simulation motor 20 is parallel to but is different from the axis of the planetary gear mechanism 50, another transmission mechanism, such as a coupling, or another common transmission mechanism, may be used to implement connection between the simulation motor 20 and the sun gear 53. In addition, when the axis of the simulation motor 20 is not parallel to the axis of the planetary gear mechanism 50, the connection between the simulation motor 20 and the sun gear 53 may be implemented by referring to a transmission manner of the booster motor 30.

Referring to FIG. 3B and FIG. 4, the foregoing description shows that the brake pedal 10 drives the ring gear 52 to rotate, and the simulation motor 20 is connected to the sun gear 53. Based on this, it can be learned from the analysis of the force acting on the planetary gear mechanism 50 shown in FIG. 3B that the ring gear 52 and the sun gear 53 are arranged on two sides of the planet carrier 51, the planet carrier 51 is used as a pivot point, and the ring gear 52 and the sun gear 53 are subject to forces at both ends of a lever. Therefore, although forces applied by the simulation motor 20 and the brake pedal 10 act in a same direction on the planetary gear mechanism 50, the simulation motor 20 can still simulate a pedal force of the brake pedal 10.

Still referring to FIG. 4 and FIG. 6, an axis of the brake master cylinder 40 is perpendicular to the axis of the planetary gear mechanism 50, and the brake master cylinder 40 is a common hydraulic cylinder in the other approaches, and includes a cylinder body and a piston rod 41 slidably connected to the cylinder body. When being connected to the planetary gear mechanism 50, the brake master cylinder 40 is connected to a second rack 82. The planet carrier 51 and a second gear 81 are fixedly connected and coaxially disposed. The second rack 82 meshes with the second gear 81. The planet carrier 51 rotates to drive the second gear 81 to rotate, and the second gear 81 drives the second rack 82 to slide, to drive the piston rod 41 to slide, thereby driving the brake master cylinder 40 to apply work and providing a braking force acting on wheels of the electric vehicle. The second rack 82 and the second gear 81 are used as the third transmission mechanism 80, so that the planet carrier 51 drives the piston rod 41 to move linearly. Certainly, the third transmission mechanism 80 is not limited to the foregoing gear-rack mechanism, and another existing known structure that can convert rotation to linear motion can also be used.

Still referring to FIG. 4, the planetary row coupling node 100 further includes a reset spring 90. The reset spring 90 is a torsion spring. The planetary gear mechanism 50 further includes a housing (not shown) that encloses the ring gear 52, the planet carrier 51, and the sun gear 53. The torsion spring has one end fixed to the housing, and the other end fixed to the sun gear 53. When the simulation motor 20 drives the sun gear 53 to rotate, the torsion spring is deformed. After the simulation motor 20 stops, an elastic force of the torsion spring drives the sun gear 53 to rotate reversely and restore to an initial position.

As shown in FIG. 5 and FIG. 6, the planetary row coupling node 100 further includes a limiting device 200. The limiting device 200 is configured to limit the sun gear 53 to rotate to a specified angle. When the limiting device 200 is further disposed, the limiting device 200 is configured to limit a rotation direction of the sun gear 53 to be opposite to a rotation direction of the sun gear 53 driven by the simulation motor 20. When the simulation motor 20 fails, the planet carrier 51 drives the sun gear 53 to rotate reversely, and when the sun gear 53 rotates reversely by a specified angle, it is limited by the limiting device 200 that the sun gear 53 cannot continue to rotate when the sun gear 53 rotates to the specified angle.

Figure 7:
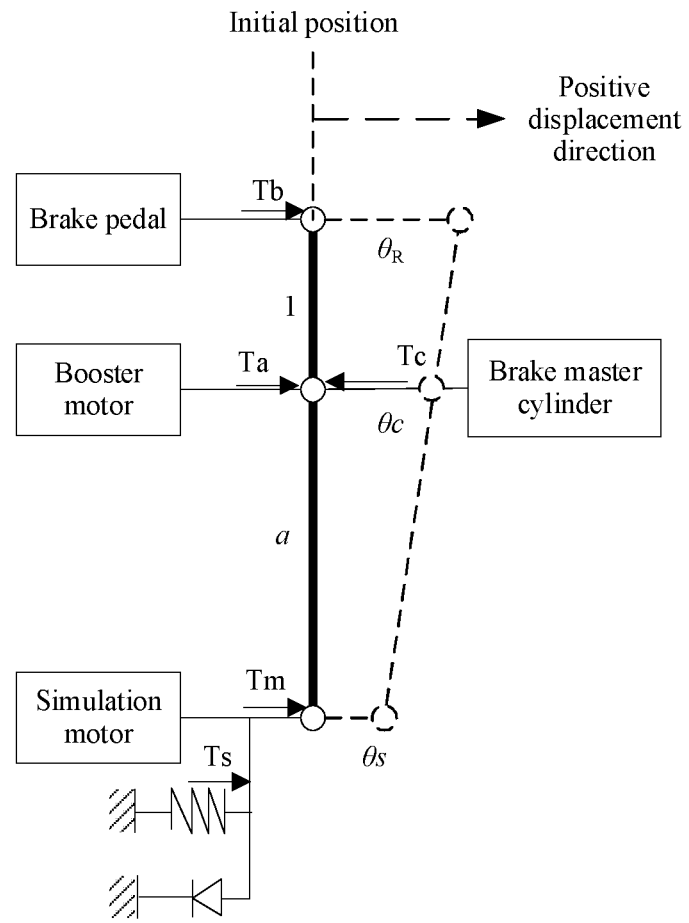
FIG. 7 is an analysis diagram of a force acting on a brake assistance system according to an embodiment of this application.

FIG. 7 is an analysis diagram of a force acting on a brake support system according to an embodiment of this application. A dashed arrow shows a motion direction of the planetary gear mechanism. The planetary gear mechanism 50 is used in the planetary row coupling node 100. It can be learned from the foregoing description that analysis of a force acting on the planetary gear mechanism 50 may be equivalent to analysis of a lever force. Therefore, in FIG. 7, the planetary gear mechanism 50 is equivalent to a lever. In FIG. 7, $T_b$ is a torque generated by the brake pedal 10 to the ring gear 52, $T_m$ is a torque generated by the simulation motor 20 to the sun gear 53, $T_a$ is a torque generated by the booster motor 30 to the planet carrier 51, $T_c$ is a torque generated by the brake master cylinder 40 to the planet carrier 51, and $T_s$ is a torque generated by the reset spring 90 to the sun gear 53. a is a gear ratio of the ring gear 52 to the sun gear 53. $\theta_R$ is a rotation angle of the ring gear 52, that is, an angular displacement of the brake pedal 10. $\theta_c$ is a rotation angle of the planet carrier 51, that is, an angular displacement of the booster motor 30 (or the brake master cylinder 40). $\theta_s$ is a rotation angle of the sun gear 53, that is, an angular displacement the simulation motor 20.

When the planetary gear mechanism is used, the following three formulas may be obtained according to the foregoing formula (1), formula (2), and formula (3):

$$T_b = a(T_m + T_s), \tag{4}$$

$$T_c - T_a = T_b + T_m + T_s, \text{ and} \tag{5}$$

$$a\theta_R + \theta_s = (1+a)\theta_c. \tag{6}$$

It can be learned from the foregoing formula (5) that $T_c = T_a + T_b\ T_m + T_s$. That is, the torque applied by the brake master cylinder to the planet carrier is equal to a sum of the torque of the brake pedal, the torque of the booster motor, the torque generated by the reset spring to the sun gear, and the torque of the simulation motor. Therefore, the torque provided in this embodiment of this application may be used to apply work on the brake master cylinder at the same time, to drive the brake master cylinder to brake the wheels of the electric vehicle. Certainly, the foregoing reset spring may be an optional apparatus. When there is no reset spring, $T_c=T_a+T_b+T_s$, that is, the torque applied by the brake master cylinder to the planet carrier is provided by using the torque of the brake pedal, the torque of the booster motor, and the torque of the simulation motor. In this case, the planetary row coupling node is used to convert the torque of the brake pedal, the torque output by the booster motor, and the torque output by the simulation motor into a force acting on the piston rod in the brake master cylinder.

When needed, there are two ways of braking the electric vehicle: motor braking and brake assistance system braking. Selection of different braking manners is determined based on a battery level of the electric vehicle. When the battery level is high, the battery does not need to be charged reversely, and braking by only the brake assistance system may be used. When the battery needs to be charged, the motor braking and the brake assistance system braking can be selected to be performed at the same time, or the motor braking is performed independently. The following describes the brake assistance system in detail with reference to the foregoing different working modes.

Figure 8:
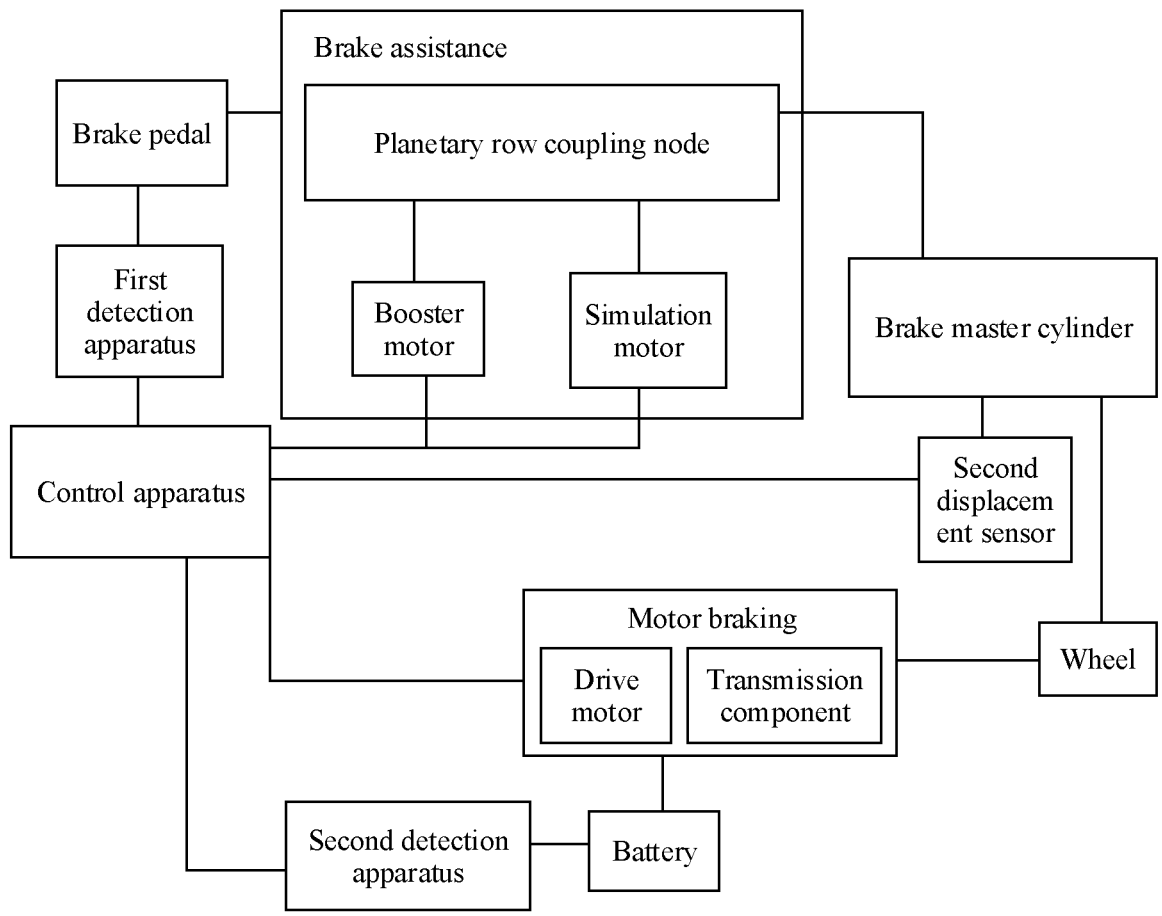
FIG. 8 is a control block diagram according to an embodiment of this application.

FIG. 8 is a control structure block diagram of a brake assistance system. The brake assistance system provided in this embodiment of this application further includes a first detection apparatus and a second detection apparatus. The first detection apparatus is configured to obtain brake information of an electric vehicle. The first detection apparatus may be a first displacement sensor or an ADAS of the electric vehicle for detecting a position of a brake pedal. The ADAS system may be an existing ADAS system. A specific implementation of the ADAS system is not described in detail herein. When the first detection apparatus is the first displacement sensor, the brake information of the electric vehicle is the position of the brake pedal. The second detection apparatus is configured to detect a battery level of a battery of the electric vehicle. The second detection apparatus may be an existing power sensor or another common sensor for detecting a battery level.

Still referring to FIG. 8, the brake assistance system provided in this embodiment of this application further includes a control apparatus. The control apparatus is separately connected to the first detection apparatus, the second detection apparatus, a booster motor, a simulation motor, and a brake master cylinder. During control, the control apparatus obtains a brake requirement of the electric vehicle based on the brake information of the electric vehicle that is detected by the first detection apparatus. When the first detection apparatus is the first displacement sensor, the control apparatus obtains the brake requirement of the electric vehicle based on the position of the brake pedal that is detected by the first displacement sensor and a specified correspondence between the position of the brake pedal and the brake requirement. When the ADAS system is used, the control apparatus can directly obtain the brake requirement from the ADAS system.

In addition, the control apparatus determines a braking force allocation proportion of each of a motor and the brake master cylinder in the electric vehicle based on the brake requirement of the electric vehicle and the battery level of the battery of the electric vehicle that is obtained by the second detection apparatus. When it is determined whether motor braking or brake assistance system braking is used for the electric vehicle, the battery level is used as a reference. For example, when the battery level reaches a specified value, and the specified value may be 70%, 80%, or 90% of a full battery level, it is determined that the battery does not need to be charged. In this case, only the brake assistance system is selected for braking, that is, the brake assistance system provides a 100% brake requirement. When the battery level is less than the specified value, it is determined that the battery needs to be charged. In this case, the control apparatus controls the motor braking and the brake assistance system braking, or uses only the motor braking. When both the motor braking and the brake assistance system braking are used, the braking force allocation proportion of each of the motor braking and the brake assistance system braking is determined based on the battery level. The braking force allocation proportion may be adjusted based on an actual requirement. This is not limited herein.

When the control apparatus obtains the brake information of the electric vehicle, the control apparatus may obtain a first torque of the simulation motor based on the brake information. For example, the first detection apparatus is the first displacement sensor. The control apparatus may obtain a braking force of the brake pedal based on the position of the brake pedal that is detected by the first displacement sensor and a correspondence between the position of the brake pedal and the braking force of the brake pedal. The braking force of the brake pedal is a pedal force of the brake pedal. The position of the brake pedal and the pedal force of the brake pedal may be set by using a specified curve, for example, three different curves f1, f2, and f3 in FIG. 9. A driver may select different pedal curves based on a requirement. If the braking force of the brake pedal is $F_{padel}$, and the position of the brake pedal is $S_{padel}$, the following formula 7 is met:

$$F_{padel}=f_i(S_{padel}), i=1,2,3 \quad (7)$$

The control apparatus calculates, based on the actual position $S_{padel}$ of the brake pedal that is detected by the first displacement sensor and the corresponding curve (that is, the formula 7) in FIG. 9, a pedal force that needs to be simulated by the simulation motor, and further calculates a torque $T_{b\_trg}$ of the brake pedal, that is, a target value of a torque acting on a ring gear in a planetary gear mechanism, as shown in the following formula:

$$T_{b\_trg}=i_1 F_{padel}, \quad (8)$$

where $i_1$ is a speed ratio coefficient of a first gear to a first rack in a first transmission mechanism.

The control apparatus may obtain the first torque of the simulation motor based on analysis of a force acting on the planetary gear mechanism and the formula 8:

$$T_{m\_cmd} = \frac{1}{a} T_{b\_trg} - T_s, \quad (9)$$

where $T_{m\_cmd}$ is the first torque, a represents a gear ratio of the ring gear to a sun gear, $T_s$ is a torque of a reset spring to the sun gear, $T_{b\_trg}$ is the torque of the brake pedal, $F_{padel}$ is the braking force of the brake pedal, and $i_1$ is the speed ratio coefficient of the first gear to the first rack in the first transmission mechanism.

During determining of $T_s$, the control apparatus obtains a rotation angle of the sun gear based on the position of the brake pedal that is detected by the first displacement sensor and the braking force allocation proportion of the brake master cylinder, and obtains the torque of the reset spring to the sun gear based on the rotation angle of the sun gear and an elastic coefficient of the reset spring. Because the reset spring in this embodiment of this application has only a reset function, $T_s$ may be approximately considered as a relatively small constant value in a normal working mode. Certainly, when the brake assistance system has no reset spring, $T_s=0$.

When the electric vehicle implements self-driving by using the ADAS system, the brake pedal is not stepped on, and the corresponding braking force $F_{padel}$ of the brake pedal when the brake pedal is at an initial position is obtained according to the formula 7, to obtain the first torque of the simulation motor.

After determining the first torque of the simulation motor, the control apparatus may determine a second torque of the booster motor based on the obtained first torque and the braking force allocation proportion of the brake master cylinder. After the braking force distribution proportion of the brake master cylinder is obtained, a braking force that needs to be provided by the brake master cylinder may be determined.

During determining of the second torque of the booster motor, the second torque $T_{a\_FF}$ of the booster motor may be calculated based on the braking force of the brake master cylinder, the second torque of the simulation motor, and a force relationship of the planetary gear mechanism and according to the formula 10 and the formula 11:

$$T_{c\_trg}=F_{piston\_trg} \cdot i_2, \text{ and} \quad (10)$$

$$T_{a\_FF}=T_{c\_trg}(a+1)(T_{m\_cmd}+T_s), \quad (11)$$

where $F_{piston\_trg}$ is the braking force of the brake master cylinder, $i_2$ is a speed ratio coefficient of a second gear and a second rack in a third transmission mechanism, and $T_{c\_trg}$ is a torque applied by the brake master cylinder to the planet carrier.

$T_{a\_FF}$ is the second torque, $T_{m\_cmd}$ is the first torque, Ts is the torque of the reset spring to the sun gear, and a represents the gear ratio of the ring gear to the sun gear.

After determining the first torque of the simulation motor and the second torque of the booster motor, the control apparatus controls the booster motor and the simulation motor to output the first torque and the second torque respectively, and brakes the electric vehicle by using the brake master cylinder.

Still referring to FIG. 8, when the braking force of the brake master cylinder is determined, the piston rod forms a stroke of the brake master cylinder based on a torque action output by the planetary gear mechanism, and a relationship between the stroke $S_{piston}$ of the brake master cylinder and the braking force of the brake master cylinder is determined by a feature of the brake master cylinder. The feature meets formula 12:

$$F_{piston\_trg}=g(S_{piston}). \quad (12)$$

Herein, g is a performance curve of the brake master cylinder. A curve corresponding to each brake master cylinder is unique. The performance curve may be obtained by using a performance parameter of the brake master cylinder.

After the braking force that needs to be provided by the brake master cylinder is determined, the stroke of the brake master cylinder, that is, a distance by which the piston rod of the brake master cylinder needs to move may be determined by using the formula 12.

The brake assistance system provided in this embodiment of this application further includes a second displacement sensor for detecting a displacement of the piston rod of the brake master cylinder. The displacement of the piston rod is the stroke $S_{piston}$ of the brake master cylinder. The control apparatus is further configured to obtain, based on the braking force allocation proportion of the brake master cylinder, a displacement value by which the piston rod of the brake master cylinder needs to move to reach, that is, the stroke $S_{piston}$ by which the brake master cylinder needs to move, and when the second displacement sensor detects that the displacement of the piston rod does not reach the displacement value, control the booster motor to drive the piston rod to move to the displacement value. In the foregoing solution, closed-loop control is used for the brake master cylinder, thereby ensuring a braking effect of the electric vehicle. In the foregoing description, the stroke of the brake master cylinder is used as a reference for the closed-loop control. Certainly, an angular displacement of the planet carrier connected to the brake master cylinder may alternatively be used as a reference for the closed-loop control. In this case, a difference between the angular displacement of the planet carrier and a target angular displacement is detected, and the booster motor is controlled to drive the planet carrier to rotate to the target angular displacement.

For ease of understanding of an operating principle of the brake assistance system provided in this embodiment of this application, the following uses different braking cases for description. First, braking modes of the electric vehicle are classified. In this embodiment of this application, the braking modes are classified into two types an assisted braking mode and an active braking mode. The boost braking mode is a braking mode in which the driver participates, that is, a braking mode in which the driver steps on the brake pedal. In this case, the first detection apparatus is the first displacement sensor. The active braking mode is a braking mode in which the electric vehicle is in a self-driving state, that is, braking during self-driving by using the ADAS system. In this case, the first detection apparatus is the ADAS system.

Figure 10A:
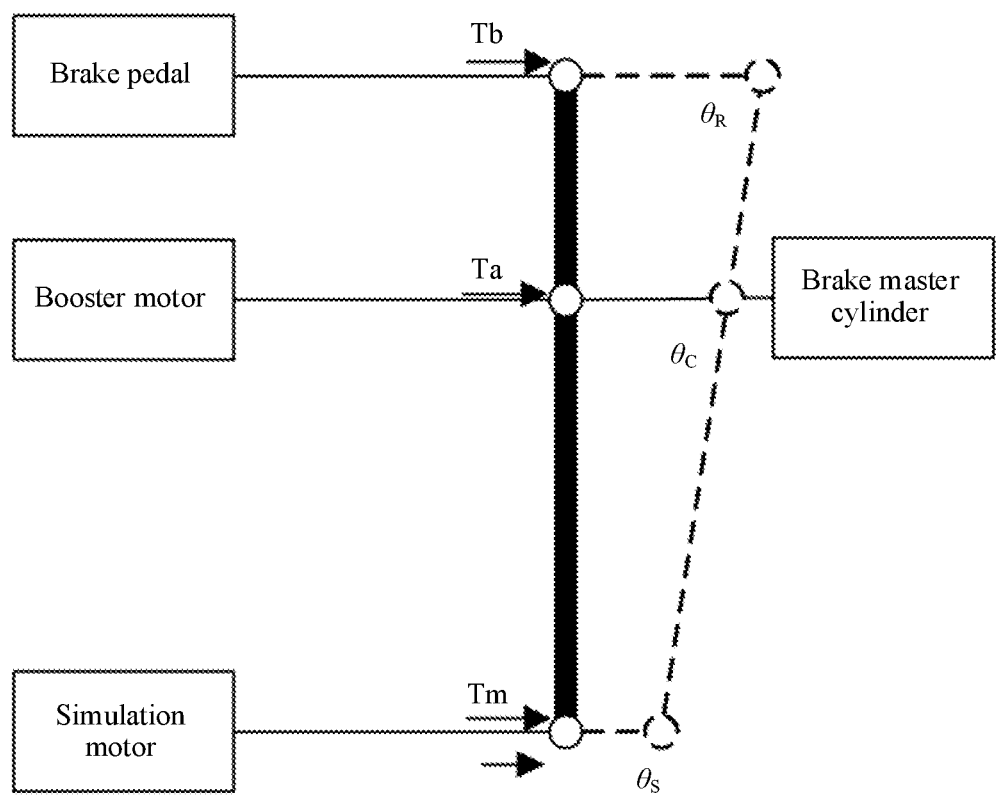
FIG. 10A is an analysis diagram of a force acting on a brake assistance system during braking only by the brake assistance system according to an embodiment of this application.
Figure 10B:
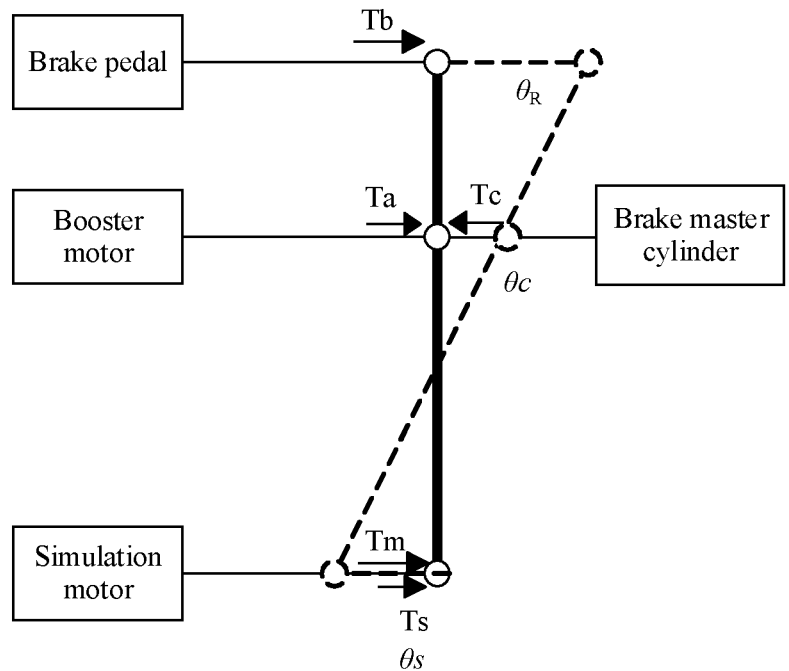
FIG. 10B is an analysis diagram of a force acting on a brake assistance system during braking by a motor and the brake assistance system according to an embodiment of this application.
Figure 10C:
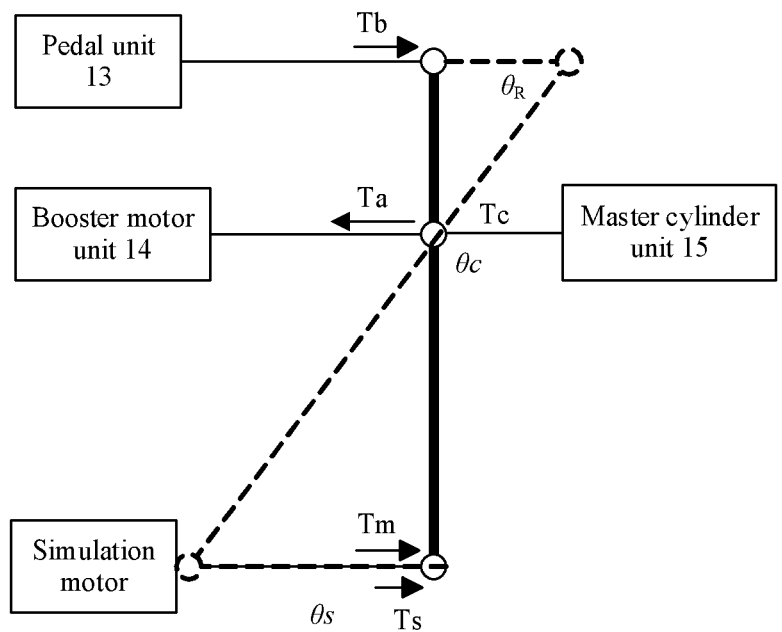
FIG. 10C is an analysis diagram of a force acting on a brake assistance system during braking by a motor according to an embodiment of this application.

First, the assisted braking mode is described. Referring to FIG. 10A to FIG. 10C, FIG. 10A is an analysis diagram of a force acting on a brake assistance system during braking only by the brake assistance system (sub-mode 1). FIG. 10B is an analysis diagram of a force acting on a brake assistance system during braking by a motor and the brake assistance system (sub-mode 2). FIG. 10C is an analysis diagram of a force acting on a brake assistance system during braking by a motor (sub-mode 3).

In FIG. 10A to FIG. 10C, the foregoing force analysis formula 2 of the planetary gear mechanism is met, and $T_c=T_a+T_b \ T_m+T_s$ may be obtained according to the force analysis formula 2 of the planetary gear mechanism. The brake pedal (acting torque $T_b$), the booster motor (acting torque $T_a$), and the simulation motor (acting torque $T_m$) and the reset spring (acting torque $T_s$) jointly acts on the brake master cylinder (acting torque $T_c$). Pressure generated by the brake master cylinder is a combined force of the four torques. Therefore, with a same assisting effect, in this embodiment of this application, requirements for a torque and power of a single motor (the simulation motor or the booster motor) are relatively low.

When a driver steps on the brake pedal, the booster motor drives the master cylinder to a corresponding position $\theta_c$ based on the position of the brake pedal. The following formula can be obtained according to the force analysis formula 6 of the planetary gear mechanism:

$$\theta_c = \frac{a\theta_R + \theta_s}{(1+a)}.$$

The angular displacement $\theta_R$ of the brake pedal and the displacement of the brake master cylinder (corresponding to a hydraulic braking force of the vehicle) may be decoupled (the brake pedal is decoupled). That is, with the same displacement $\theta_R$ of the brake pedal, the brake master cylinder may have different displacements (for example, the sub-mode 1, the sub-mode 2, and the sub-mode 3). Therefore, the braking force of the brake assistance system may be adjusted based on a requirement, thereby implementing electro-hydraulic decoupling.

It can be learned from the force analysis formula 1, that is, $T_b=a(T_m+T_s)$ of the planetary gear mechanism that, the simulation motor adjusts the torque $T_m$ based on a requirement, so that the torque $T_b$ of the brake pedal is adjusted. It can be learned from the formula 2, that is, $T_c=T_a+T_b+T_m+T_s$ that, the torque $T_c$ of the brake master cylinder can be maintained unchanged by synchronously adjusting $T_a$ of the booster motor, so that the angular displacements of the components of the planetary gear mechanism can be maintained unchanged (that is, $\theta_R$, $\theta_s$, and $\theta_c$ remain unchanged). Therefore, electronic adjustment of a pedal force simulation curve of the brake pedal can be implemented through coordinated control of the simulation motor and the booster motor.

When only the brake assistance system is used for braking in the sub-mode 1, pressure of the brake master cylinder is the highest, and the angle displacement $\theta_c$ of the corresponding planet carrier is the largest. In the mode in which both the brake assistance system and the motor are used for braking in the sub-mode 2, because a part of the braking force is shared by the motor braking, a required braking force of the brake assistance system is reduced compared with that in the sub-mode 1. Therefore, $\theta_c$ is correspondingly reduced. In the mode in which only the motor is used for braking in the sub-mode 3, for the braking force of the electric vehicle, electric energy is recovered by the motor, the brake master cylinder builds up no pressure, and $\theta_c=0$.

It can be learned from FIG. 10A to FIG. 10C that, in the three braking modes, the torque $T_a$ of the booster motor and the torque $T_m$ of the simulation motor are adjusted through control, thereby ensuring that a force acting on the brake pedal remain consistent, and ensuring that a driver has consistent feels in different modes.

Therefore, the following can be implemented in this embodiment of this application:

(1). Different assistance curves can be selected to implement different pedal feels (the electronic adjustment of the pedal force simulation curve of the brake pedal).

(2). A position of the brake master cylinder and the torque of the simulation motor are flexibly adjusted based on the braking force allocation proportion of the motor braking and the brake assistance system braking, so that a pedal-braking force relationship and pedal feels of the driver remain consistent under different working conditions.

(3) The driver has consistent feels in different modes.

Figure 11A:
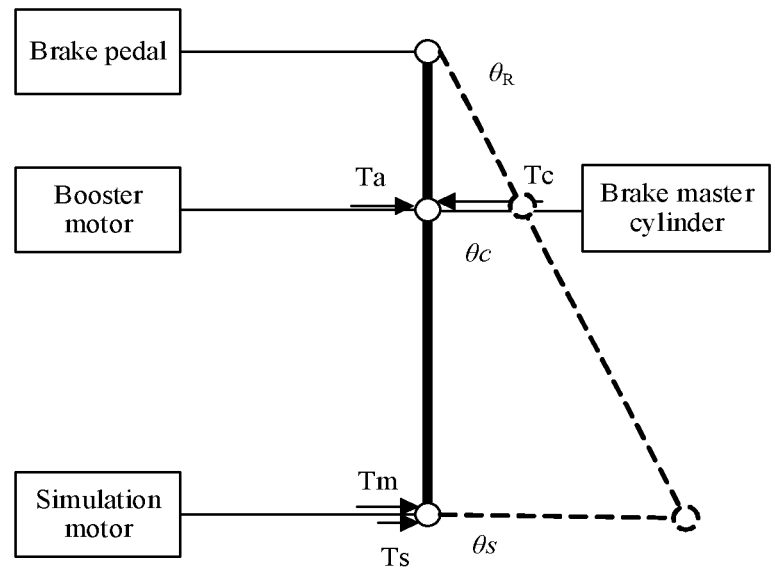
FIG. 11A is an analysis diagram of a force acting on a brake assistance system during braking only by the brake assistance system according to an embodiment of this application.
Figure 11B:
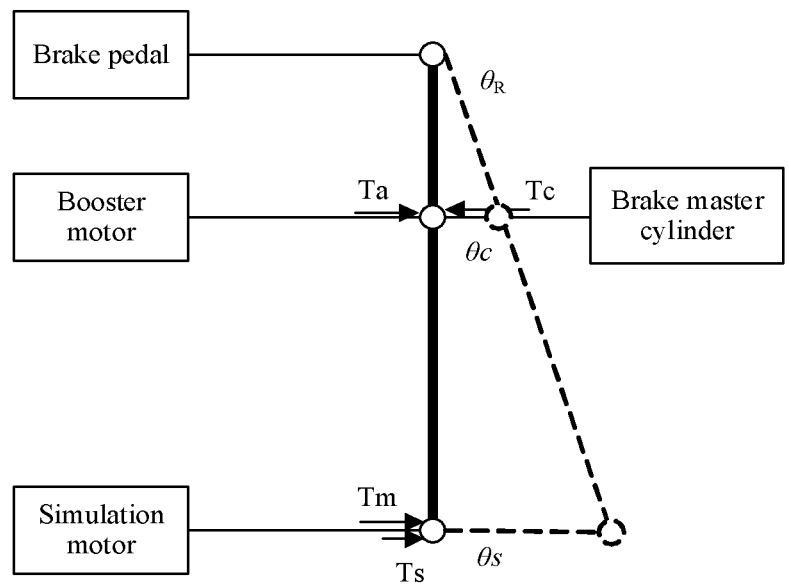
FIG. 11B is an analysis diagram of a force acting on a brake assistance system during braking by a motor and the brake assistance system according to an embodiment of this application.

Second, the active braking mode is described. Referring to FIG. 11A and FIG. 11B, FIG. 11A is an analysis diagram of a force acting on a brake assistance system during braking only by the brake assistance system (mode 4), and FIG. 11B is an analysis diagram of a force acting on a brake assistance system during braking by a motor and the brake assistance system (mode 5).

When the active braking mode is used, the brake information of the electric vehicle is obtained by using the ADAS system, and the driver does not need to step on the brake pedal. Therefore, the brake pedal remains in an initial position. In addition, the brake pedal can only move on a right side of the initial position under action of a pedal limiting device (the pedal limiting device is a device in the other approaches, and is not described herein). Therefore, in this state, the torque $T_b$ of the brake pedal comes from a reverse acting force of the pedal limiting device, and Tb is a passive force. In force analysis in FIG. 11A to FIG. 11C, Tb is omitted.

In the active braking mode, the brake master cylinder can be driven by using only the booster motor or the simulation motor. However, alternatively, both the booster motor and the simulation motor may be used to work at the same time.

Referring to FIG. 11A and FIG. 11B, force analysis is performed on the brake assistance system in the active braking mode.

In the active braking mode, the brake pedal needs to remain in an original position, that is:

$\theta_R=0$.

According to the formula 6, the following may be obtained.

An angle displacement relationship between the brake master cylinder and the simulation motor is as follows:

$$\theta_c = \frac{1}{a+1}\theta_s.$$

According to the formula 4 and the formula 6, the torque of the brake master cylinder, the torque of the booster motor, the torque of the brake pedal, and the torque of the simulation motor meet formula 14:

$$T_c=(a+1)T_m+T_a-T_s \qquad (14).$$

It can be obtained from the foregoing formula that, the angle displacement $\theta_c$ and the torque $T_c$ of the brake master cylinder can achieve required target values through joint driving by the booster motor and the simulation motor. Therefore, when the brake pedal remains in the original position, in this embodiment of this application, the required brake pedal can be decoupled from the hydraulic braking force based on a brake requirement of the ADAS.

Figure 11C:
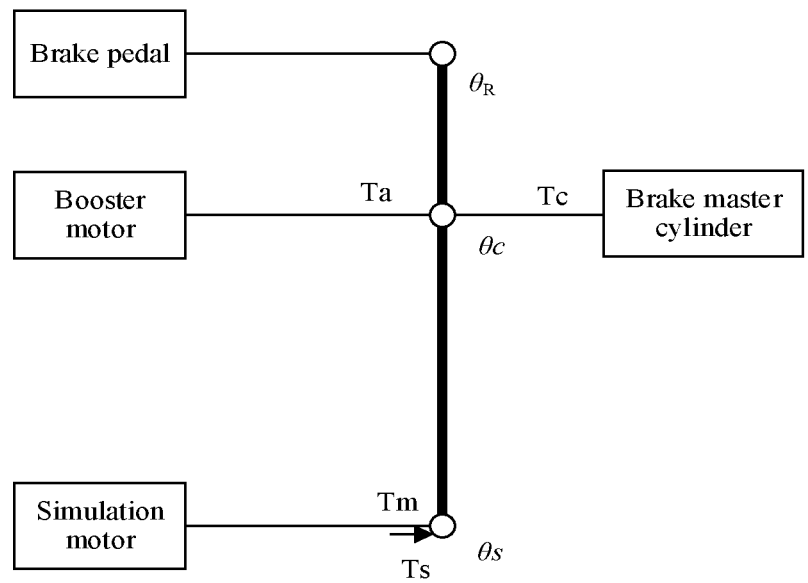
FIG. 11C is an analysis diagram of a force acting on a brake assistance system during braking only by a motor according to an embodiment of this application.

FIG. 11A to FIG. 11C show working statuses of the brake assistance system in this application in three different sub-modes under a same total braking force requirement.

In a sub-mode 4, as shown in FIG. 11A, an entire braking force comes from the brake assistance system. Therefore, the braking force of the brake assistance system is the largest, and the angular displacement $\theta_c$ of the brake master cylinder is the largest, and the torque $T_c$ of the corresponding brake master cylinder is also the largest. In a sub-mode 5, as shown in FIG. 11B, a part of the braking force is implemented through electric braking of the motor. Therefore, the braking force of the brake assistance system is reduced, and the angular displacement $\theta_c$ of the brake master cylinder is reduced. In a sub-mode 6, as shown in FIG. 11C, all braking energy is implemented by electric braking of the motor, and the braking force of the brake assistance system is zero. Therefore, the brake assistance system remains at the original position, and the simulation motor and the booster motor may be in an off state and do not work.

During use of the electric vehicle, a motor failure inevitably occurs in the brake assistance system. There are three motor failure modes in the brake assistance system The booster motor fails, the simulation motor fails, and both the booster motor and the simulation motor fail. When a motor failure occurs, the control apparatus is further configured to, when the booster motor or the simulation motor fails, determine, based on the braking force allocation proportion of the brake master cylinder, a third torque of a non-failed simulation motor or a non-failed booster motor, and control the non-failed simulation motor or the non-failed booster motor to output the third torque. The following separately describes, with reference to the accompanying drawings, the cases in which the booster motor fails, the simulation motor fails, and both the booster motor and the simulation motor fail.

Figure 12A:
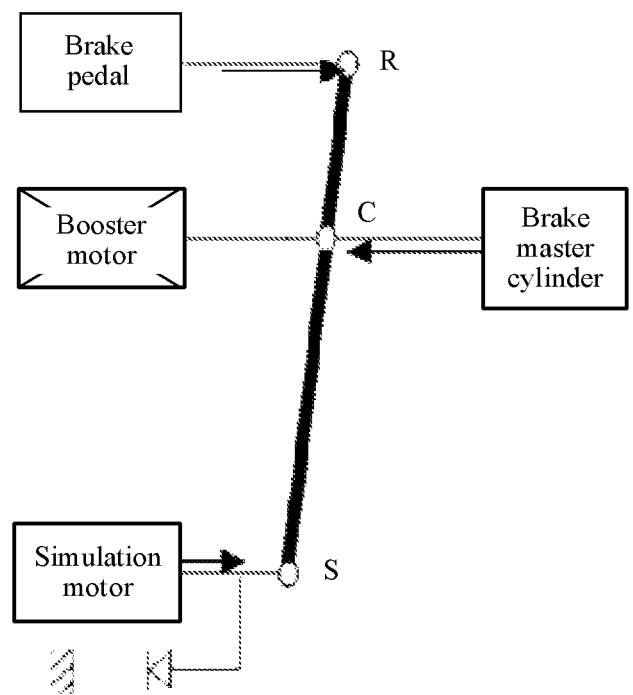
FIG. 12A is an analysis diagram of a force acting on a brake assistance system when a booster motor fails according to an embodiment of this application.
Figure 12B:
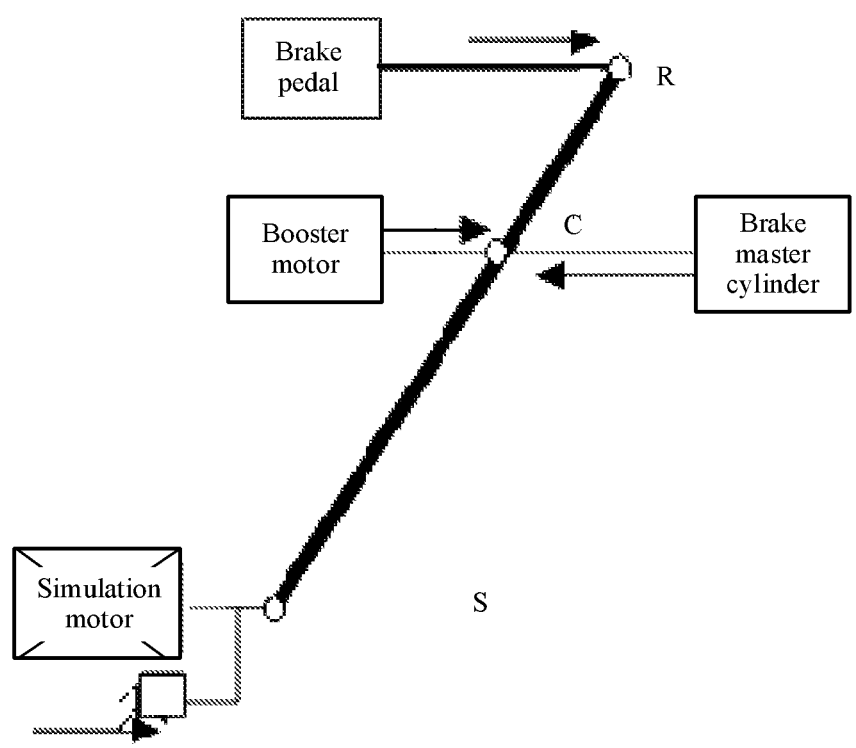
FIG. 12B is an analysis diagram of a force acting on a brake assistance system when a simulation motor fails according to an embodiment of this application.
Figure 12C:
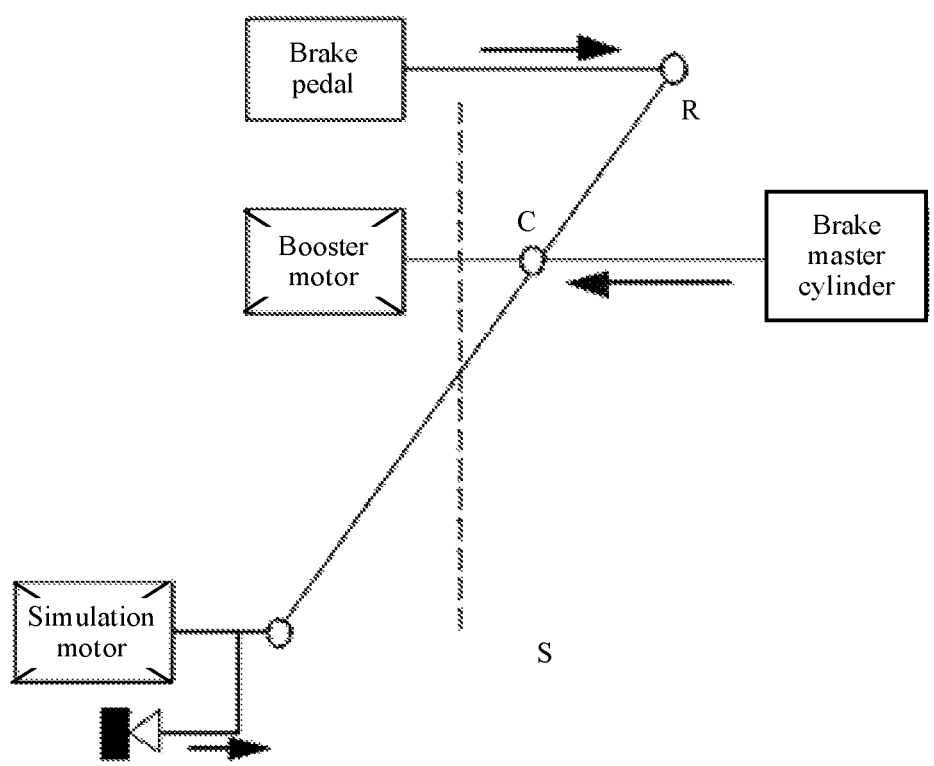
FIG. 12C is an analysis diagram of a force acting on a brake assistance system when a simulation motor and a booster motor fail according to an embodiment of this application.

First, refer to FIG. 12A to FIG. 12C. FIG. 12A to FIG. 12C are each an analysis diagram of a force acting on a brake assistance system when a motor in an assisted braking mode fails. FIG. 12A shows a specific case in which the booster motor fails. When the booster motor fails, the control apparatus calculates, based on the braking force allocation proportion of the brake master cylinder, the third torque of the non-failed simulation motor. During specific calculation, the third torque of the simulation motor may no longer be determined by using the force of the brake pedal. Instead, the torque of the brake pedal and the third torque of the simulation motor act on the brake master cylinder at the same time to provide a force required for braking. FIG. 12B shows a case in which the simulation motor fails. When the simulation motor fails, the simulation motor cannot provide a pedaling force corresponding to the brake pedal. When the brake pedal is stepped on, a disposed limiting device is used to limit the sun gear, so that the sun gear cannot continue to rotate after being driven by the planet carrier to rotate reversely to a specified angle. In this case, the torque of the brake master cylinder is equal to a sum of the torque of the brake pedal, the third torque of the booster motor, and a torque provided by the limiting device. FIG. 12C shows a case in which both the booster motor and the simulation motor fail. In this case, through only stepping on the brake pedal, after the sun gear of the planetary gear mechanism overcomes an empty stroke of the limiting device, the limiting device can be enabled to function, so that pressure is generated on the master cylinder by using only the force of the brake pedal. Herein, due to a deceleration effect of the planetary gear mechanism, the pedal force can still be magnified by additional $$\frac{1+a}{a}$$

times, thereby allowing the electric vehicle to generate an enough braking force to ensure safety of the vehicle.

Figure 13A:
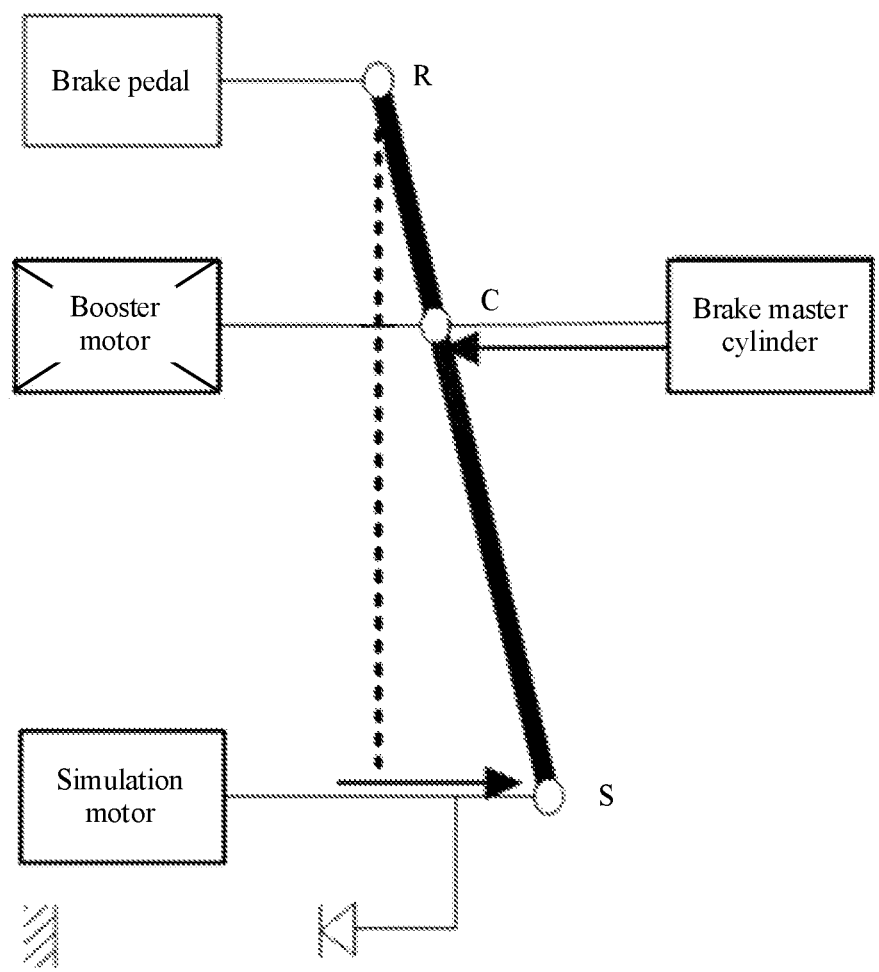
FIG. 13A is an analysis diagram of a force acting on a brake assistance system when a booster motor fails according to an embodiment of this application.
Figure 13B:
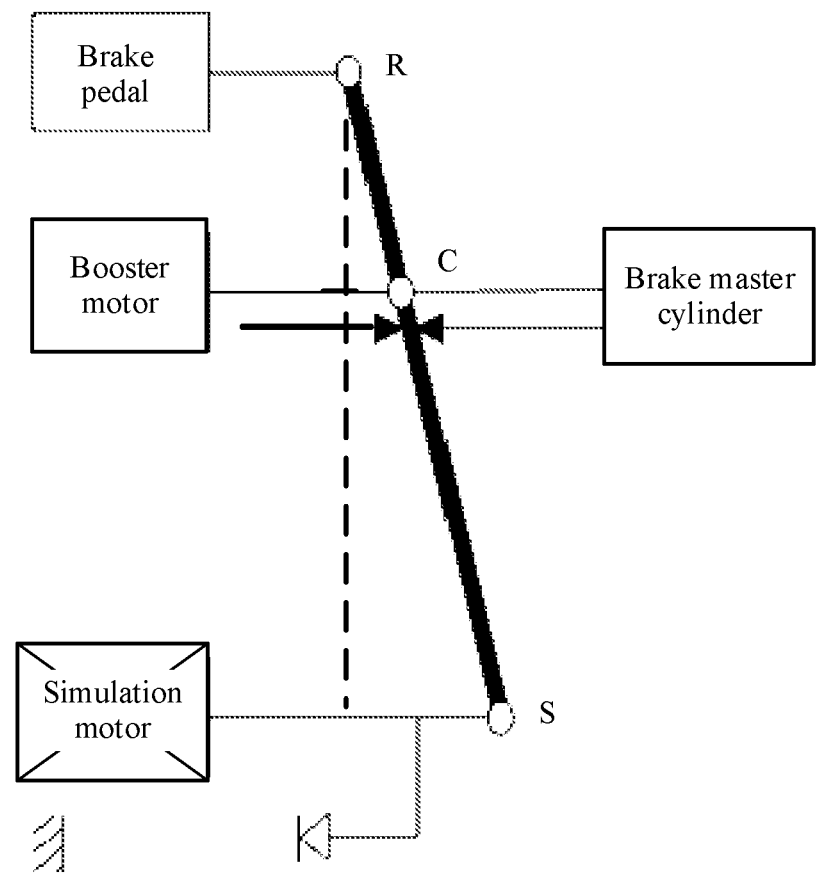
FIG. 13B is an analysis diagram of a force acting on a brake assistance system when a simulation motor fails according to an embodiment of this application.

Refer to FIG. 13A and FIG. 13B. FIG. 13A and FIG. 13B, each shows a case in which a motor in an active braking mode fails. As shown in FIG. 13A, when the booster motor fails, the brake master cylinder is driven by using the simulation motor. As shown in FIG. 13A, when the simulation motor fails, the brake master cylinder is driven by using the booster motor. However, in the active braking mode, because the brake pedal is not stepped on, when the simulation motor and a braking motor fail, the brake assistance system generates no assistance. Therefore, an active braking function fails.

It can be learned from the foregoing description that, in the brake assistance system provided in this embodiment of this application, when the booster motor fails or the simulation motor fails, the other actuator motor can independently drive the brake master cylinder. Therefore, an assisting braking function and some active braking functions can still be implemented. In this way, reliability of electric vehicle braking is improved.

In addition, the control apparatus may be further applied when the electric vehicle is in an active braking state. After the brake pedal is stepped on, when it is determined, based on a specified correspondence between a position of the brake pedal and a brake requirement, that the brake requirement provided by the brake pedal is greater than a brake requirement of active braking, the control apparatus uses the brake requirement corresponding to the brake pedal.

An embodiment of this application further provides a brake method for an electric vehicle. The brake method for the electric vehicle is applied to the foregoing brake assistance system. The method includes detecting brake information of the electric vehicle, obtaining a first torque of a simulation motor in the electric vehicle based on the brake information of the electric vehicle, obtaining a brake requirement of the electric vehicle based on the brake information of the electric vehicle, obtaining a battery level of a battery of the electric vehicle, determining a braking force allocation proportion of a motor and a brake master cylinder in the electric vehicle based on the brake requirement of the electric vehicle and the battery level of the electric vehicle, determining a second torque of a booster motor based on the first torque of the simulation motor and the braking force allocation proportion of the brake master cylinder, and controlling the simulation motor to output the first torque, and controlling the booster motor to output the second torque.

The first torque and the second torque that are respectively output by the simulation motor and the booster motor act on a piston rod in the brake master cylinder in the electric vehicle to move.

Figure 14:
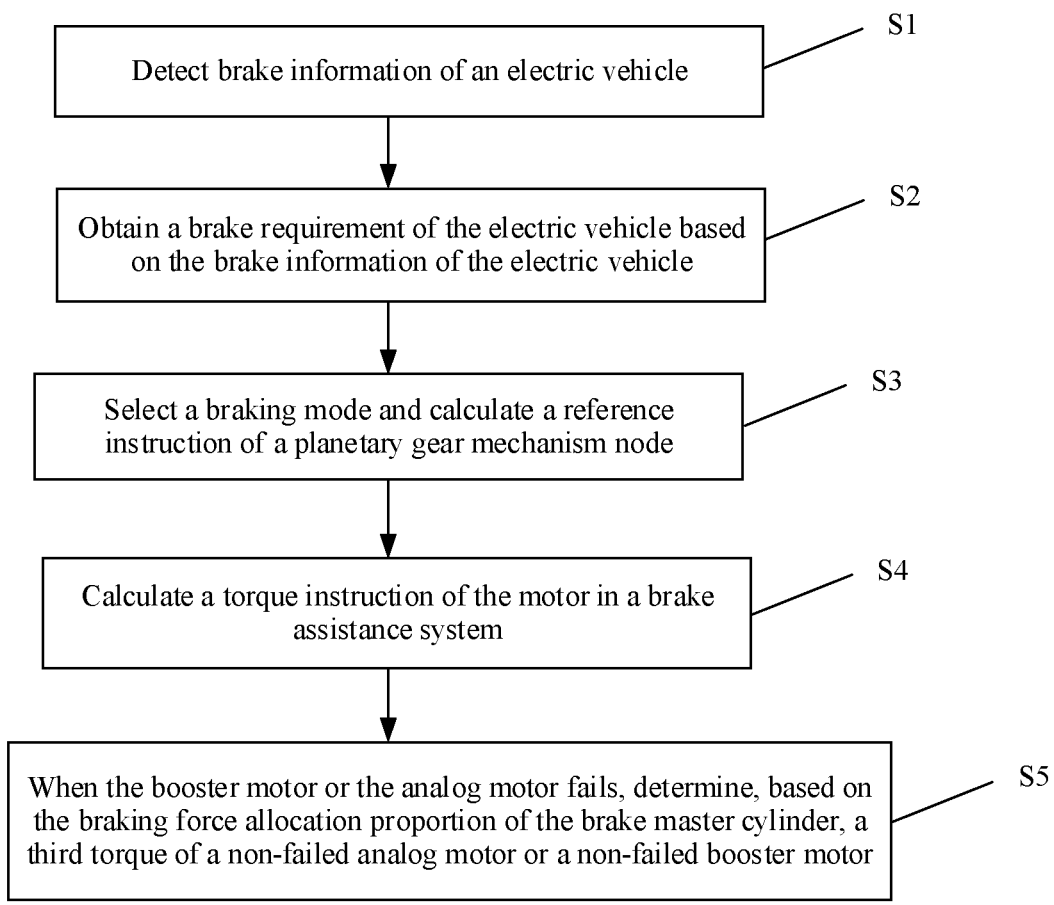
FIG. 14 is a flowchart of a brake method according to an embodiment of this application.

The following describes in detail a braking procedure provided in an embodiment of this application with reference to specific FIG. 14.

S1: Detect brake information of an electric vehicle.

Further, a current braking strength requirement of the electric vehicle is obtained based on a request sent by a driver by stepping on a brake pedal or an in-vehicle ADAS system. For details, refer to the foregoing description of control of a brake assistance system.

S2: Obtain a brake requirement of the electric vehicle based on the brake information of the electric vehicle.

Further, hydraulic braking force allocation and motor braking force allocation are performed on the electric vehicle based on information such as a speed, a steering direction, and a body posture of the electric vehicle and a state of charge (SOC), a voltage, and a temperature of a battery, and then a braking force allocation proportion of a motor and a brake master cylinder in the electric vehicle is determined. For details, refer to the foregoing description of control of the brake assistance system.

S3: Select a braking mode and calculate a reference instruction of a planetary gear mechanism node.

Figure 15:
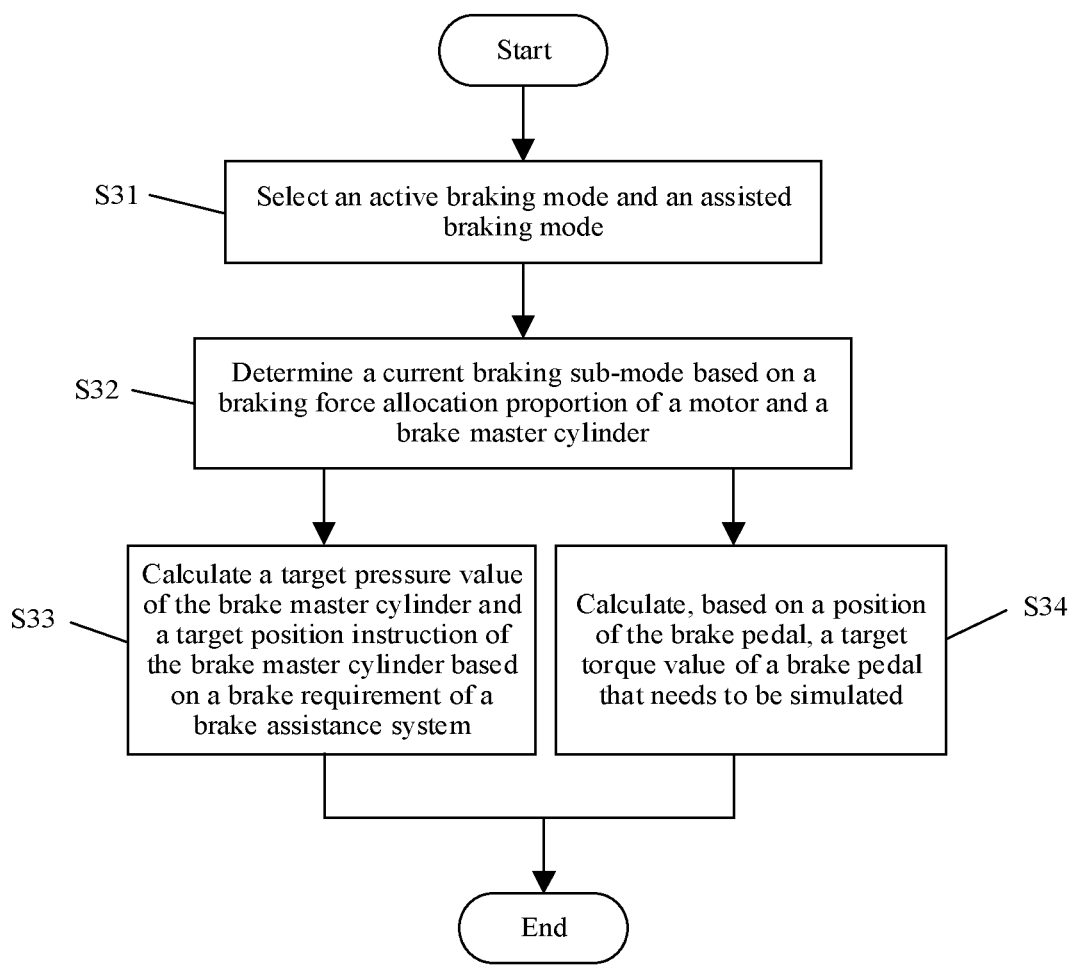
FIG. 15 is a flowchart of selecting a braking mode and calculating a reference instruction of a planetary gear mechanism node according to an embodiment of this application.

As shown in FIG. 15, the following steps are included:

S31: Select an active braking mode and an assisted braking mode.

It is determined, based on a driving status of the electric vehicle, whether to use the active braking mode or the assisted braking mode. Further, it is determined, based on information such as a position of the brake pedal, a braking instruction of the ADAS system, and whether the driver enables an automatic driving mode, that the electric vehicle should be in the active braking mode or the assisted braking mode. The other approaches are used in this process, and details are not described herein again.

During switching from the active braking mode to the assisted braking mode, when the brake pedal is stepped on, and it is determined, based on a specified correspondence between the position of the brake pedal and the brake requirement, that the brake requirement provided by the brake pedal is greater than a brake requirement of active braking, a control apparatus uses the brake requirement corresponding to the brake pedal. That is, the active braking mode is switched to the assisted braking mode. This prevents a braking force from being reduced due to a case in which a braking force provided by the brake assistance system is less than that of the active braking when the assisted braking mode is accessed and a stepping amplitude of the brake pedal is relatively small.

A motor braking mode means that the electric vehicle decelerates only by driving the motor to brake, to maximize braking energy recovery. In the assisted braking mode, motor braking may be coupled to the brake assistance system, or only the brake assistance system may work (when a battery SOC is relatively high). For details, refer to the foregoing description of control of the brake assistance system.

S32: Determine a current braking sub-mode based on a braking force allocation proportion of the motor and the brake master cylinder.

For the brake assistance system provided in this application, control logic of six braking modes may be implemented, as shown in Table 1 of FIG. 18. In this step, a sub-mode in which the brake system should work is selected based on a working condition of a braking mode listed in Table 1 of FIG. 18 and a current allocation status of an electro-hydraulic brake requirement, and a control mode required by a booster motor and a simulation motor is determined.

Note: √ indicates that there is a corresponding brake requirement, and X indicates that the corresponding brake requirement is 0. Position control means that a final rotation angle position of an actuator motor is used as a closed-loop control target. Torque control means that a torque output by the actuator motor is used as a control target.

S33: Calculate a target pressure value of the brake master cylinder and a target position instruction $\theta_{c\_trg}$ of the brake master cylinder based on a brake requirement of the brake assistance system.

A braking torque is related to hydraulic pressure of the brake master cylinder, and is determined by a design of a hydraulic pipeline. Calculation of a hydraulic pressure target value $F_{piston\_trg}$ of the brake master cylinder belongs to the other approaches, and details are not described herein.

The hydraulic pressure of the brake master cylinder is related to a stroke of the brake master cylinder, and is determined by a feature of the brake master cylinder. A stroke target value $S_{piston\_trg}$ of the brake master cylinder may be obtained by looking up a table. The table may be obtained by referring to the other approaches.

Because the brake master cylinder is connected to the planet carrier by using a gear and a rack, the stroke target value $S_{piston\_trg}$ of the master cylinder and a position target instruction $\theta_{c\_trg}$ of the planet carrier meet $S_{piston\_trg}=\theta_{c\_trg}/i_2$. Therefore, a target value of an angular displacement $\theta_{c\_trg}$ of the planet carrier may be obtained by calculating the stroke target value of the brake master cylinder:

$$\theta_{c\_trg}=S_{piston\_trg}/i_2,$$

where $i_2$ is a speed ratio coefficient of a third gear and a third rack of a third transmission mechanism.

S34: Calculate, based on a position of the brake pedal, a torque $T_{b\_trg}$ of the brake pedal that needs to be simulated.

Figure 9:
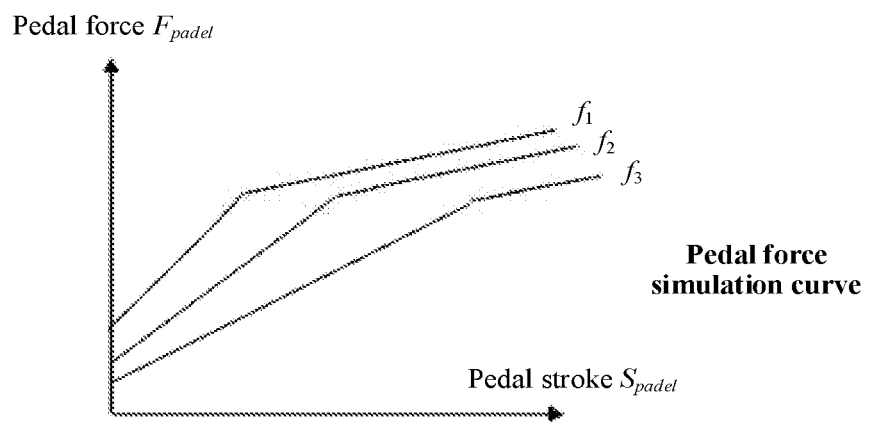
FIG. 9 is a curve diagram of a brake pedal and a corresponding braking force according to an embodiment of this application.

A pedal force of the brake pedal may be set by using a specified curve, for example, three different curves set in FIG. 9, and is selected by the driver. This is expressed by using formula 7:

$$F_{padel}=f_i(S_{padel}), i=1,2,3$$

The control apparatus calculates, based on an actual position $S_{padel}$ of the brake pedal that is detected by a first displacement sensor and a corresponding curve (that is, the formula 7) in FIG. 9, a pedal force that needs to be simulated by the simulation motor, and further calculates the torque $T_{b\_trg}$ of the brake pedal, that is, a torque acting on a ring gear in a planetary gear mechanism, as shown in the formula 8:

$$T_{b\_trg}=i_1 F_{padel},$$

where $i_1$ is a speed ratio coefficient of a first gear to a first rack in a first transmission mechanism.

S4: Calculate a torque instruction of the motor in the brake assistance system.

Figure 16:
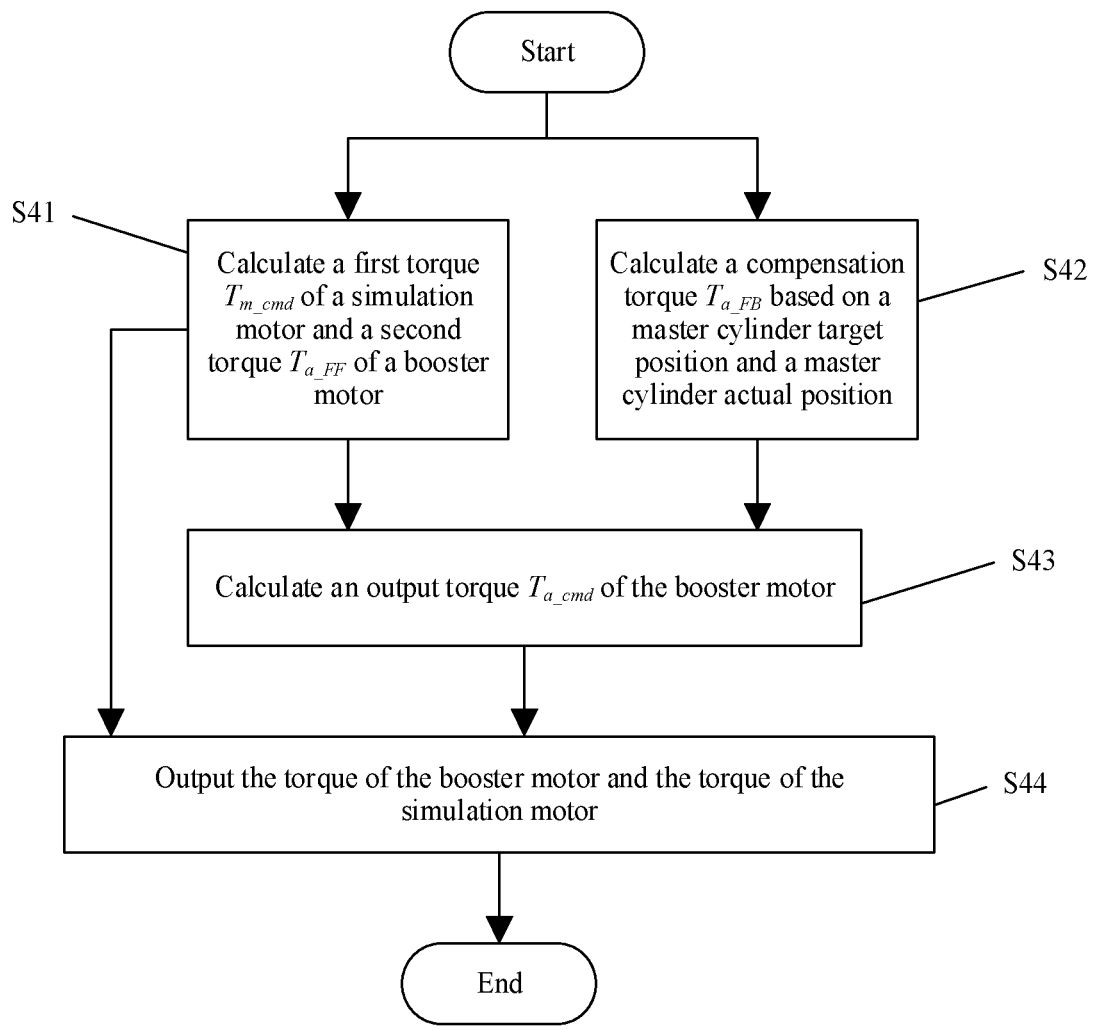
FIG. 16 is a flowchart of calculating a torque instruction of a motor in a brake assistance system according to an embodiment of this application.

FIG. 14 shows a torque calculation process of a booster mechanism motor, and FIG. 16 shows control block diagrams of S41 to S43. In this step, a coordinated control method of the booster motor and the simulation motor is designed. Torque control is used for the simulation motor, and a torque instruction required by the simulation motor is calculated based on the torque $T_{b\_trg}$ of the brake pedal that needs to be simulated in S3. Position closed-loop control is used for the booster motor, and a reference torque $T_{a\_FF}$ of the booster motor is given based on a target displacement and a torque of the simulation motor. A target position $\theta_{c\_trg}$ of the brake master cylinder is compared with an actual displacement, and then the reference torque is compensated for. In this way, the position of the brake master cylinder is stably and reliably controlled.

S41: Calculate a first torque $T_{m\_cmd}$ of the simulation motor and a second torque $T_{a\_FF}$ of the booster motor.

Figure 17:
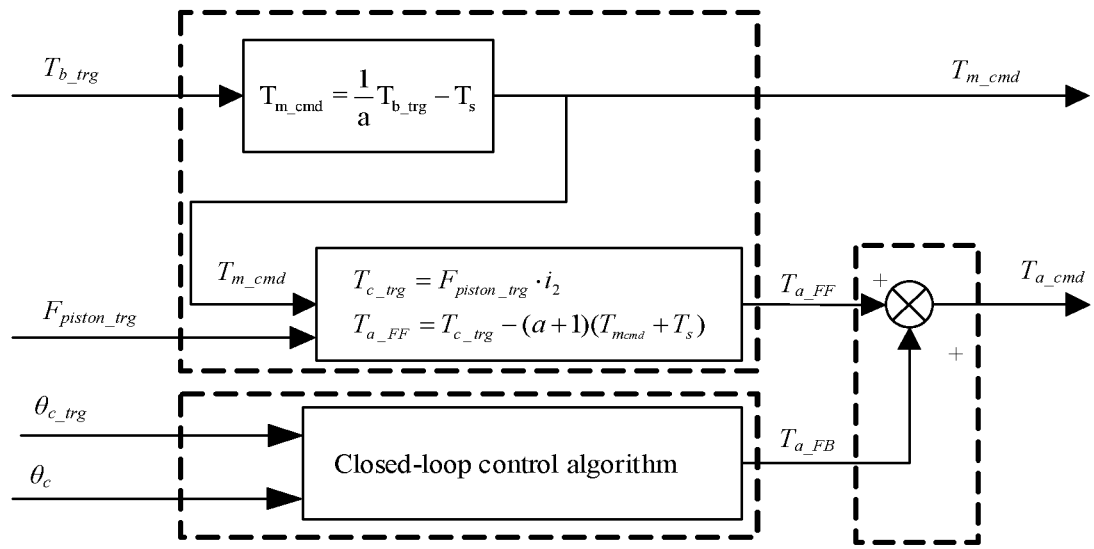
FIG. 17 is a control flowchart of a brake assistance system according to an embodiment of this application.

FIG. 17 shows a control procedure of the simulation motor and the booster motor, and calculation of the first torque $T_{m\_cmd}$ of the simulation motor. The first torque $T_{m\_cmd}$ of the simulation motor is calculated based on the torque $T_{b\_trg}$ of the brake pedal and a force relationship of the planetary gear mechanism. For details, refer to formula 9:

$$T_{m\_cmd} = \frac{1}{a}T_{b\_trg} - T_s,$$

where a represents a gear ratio of the ring gear to the sun gear.

Calculation of the second torque of the booster motor: The second torque $T_{a\_FF}$ of the booster motor is calculated based on target pressure of the brake master cylinder, the first torque $T_{m\_cmd}$ of the simulation motor, and the force relationship of the planetary gear mechanism.

$$T_{c\_trg} = F_{piston\_trg} \cdot i_2, \text{ and}$$

$$T_{a\_FF} = T_{c\_trg} - (a+1)(T_{m\_cmd} + T_s),$$

where $F_{piston\_trg}$ is a braking force of the brake master cylinder, $i_2$ is the speed ratio coefficient of the second gear to the second rack in the third transmission mechanism, and $T_{c\_trg}$ is a torque applied by the brake master cylinder to the planet carrier.

$T_{a\_FF}$ is the second torque, $T_{m\_cmd}$ is the first torque, Ts is a torque of the reset spring to the sun gear, and a represents a gear ratio of the ring gear to the sun gear.

S42. Calculate a compensation torque $T_{a\_FB}$ based on a master cylinder reference position and a master cylinder actual position.

During specific implementation, a first displacement (an actual position) of the piston rod of the brake master cylinder is detected, and a second displacement (a target position) by which the piston rod of the brake master cylinder needs to move to reach is obtained based on a braking force allocation proportion of the brake assistance system. When the first displacement does not reach the second displacement, the booster motor is controlled to drive the piston rod to the second displacement. In this part of content, an actual position $\theta_c$ of the brake master cylinder is compared with a master cylinder target position $\theta_{c\_trg}$, and a feedback compensation torque instruction $T_{a\_FB}$ is output through feedback control (such as proportional-integral-derivative (PID) control), to implement feedback adjustment.

S43: Calculate an output torque $T_{a\_cmd}$ of the booster motor.

The compensation torque of the booster motor and the second torque are added to obtain the output torque $T_{a\_cmd}$ of the booster motor:

$$T_{a\_cmd} = T_{a\_FF} + T_{a\_FB}.$$

S44: Output the torque of the booster motor and the torque of the simulation motor.

According to the instructions calculated in S41 and S43, the output torque $T_{a\_cmd}$ of the booster motor and the first torque $T_{m\_cmd}$ of the simulation motor are output to a driver of the actuator motor.

In a control policy of S4, the torque instruction of the simulation motor can be adjusted based on a pedal force expected by the driver, so that simulation of different pedal forces can be implemented. In terms of the torque of the booster motor, a feedforward torque instruction of the booster motor is calculated based on the target pressure of the brake master cylinder and the torque instruction of the simulation motor. Based on the closed-loop control, a force acting on the planetary gear mechanism is comprehensively considered to improve a response speed of the planetary gear mechanism, thereby stably and reliably controlling the position of the brake master cylinder.

S5: When the booster motor or the simulation motor fails, determine, based on the braking force allocation proportion of the brake master cylinder, a third torque of a non-failed simulation motor or a non-failed booster motor, and control the non-failed simulation motor or the non-failed booster motor to output the third torque. In this way, reliability of the brake support system is improved.

It can be learned from the foregoing description that, in the brake method provided in this application, both the torque output by the simulation motor and the torque output by the booster motor are used as the force for driving the piston rod of the brake master cylinder. This can reduce an output power requirement on a single motor. In addition, when two motors are used to drive the brake master cylinder at the same time, if one motor fails, the other motor can be used for braking, so that reliability of the entire brake assistance system is improved.

An embodiment of this application further provides an electric vehicle. The electric vehicle includes a vehicle body, a battery disposed on the vehicle body, and the brake assistance system according to any one of the foregoing implementations. In the foregoing technical solution, both the torque output by the simulation motor and the torque output by the booster motor are used as a force for driving the piston rod of the brake master cylinder. This can reduce an output power requirement on a single motor. In addition, when two motors are used to drive the brake master cylinder at the same time, if one motor fails, the other motor can be used for braking, so that reliability of the entire brake assistance system is improved.

The foregoing are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A brake assistance system comprising:
   a planetary row coupling node;
   a brake pedal coupled to the planetary row coupling node and configured to output a first torque;
   a booster motor coupled to the planetary row coupling node and configured to output a second torque;
   a simulation motor coupled to the planetary row coupling node and configured to output a third torque; and
   a brake master cylinder coupled to the planetary row coupling node and comprising a piston rod,
   wherein the planetary row coupling node is configured to convert the first torque, the second torque, and the third torque into an acting force acting on the piston rod,
   wherein the planetary row coupling node comprises:
      a planetary gear system comprising:
         a ring gear;
         a planet carrier; and
         a sun gear;
      a first transmission system;
      a second transmission system; and
      a third transmission system,
   wherein the brake pedal, the first transmission system, the ring gear and the planet carrier are sequentially connected,
   wherein the brake pedal is configured to drive, using the first transmission system and the ring gear, the planet carrier to rotate,
   wherein the booster motor is configured to drive, using the second transmission system, the planet carrier to rotate,
   wherein the simulation motor is further coupled to the sun gear and is configured to drive the sun gear to rotate, and wherein the planet carrier is configured to drive, using the third transmission system, the piston rod to move linearly.

2. The brake assistance system of claim 1, wherein the first transmission system comprises:
a first rack coupled to the brake pedal; and
a first gear meshing with the first rack, wherein the first gear and the ring gear are fixedly coupled and coaxially disposed.

3. The brake assistance system of claim 2, wherein the second transmission system comprises:
a worm coupled to the booster motor; and
a worm gear meshing with the worm, wherein the worm gear and the planet carrier are fixedly coupled and coaxially disposed.

4. The brake assistance system of claim 3, wherein the third transmission system comprises:
a second rack fixedly coupled to the piston rod; and
a second gear meshing with the second rack, wherein the second gear and the planet carrier are fixedly coupled and coaxially disposed.

5. The brake assistance system of claim 1, wherein the planetary row coupling node further comprises a limiting apparatus configured to limit rotation of the sun gear to a specified angle.

6. The brake assistance system of claim 1, wherein the planetary row coupling node further comprises a reset spring configured to drive the sun gear to an initial position.

7. The brake assistance system of claim 6, further comprising:
a first detection apparatus coupled to the brake pedal and configured to detect brake information of the electric vehicle;
a second detection apparatus configured to detect a battery level of a battery in the electric vehicle; and
a control apparatus coupled to the first detection apparatus and the second detection apparatus and configured to:
obtain a brake requirement of the electric vehicle based on the brake information;
determine, based on the brake requirement and the battery level, a first braking force allocation portion of a motor in the electric vehicle;
determine, based on the brake requirement and the battery level, a second braking force allocation portion of the brake master cylinder;
obtain the third torque based on the brake information;
determine the second torque based on the third torque and the second braking force allocation portion;
control the simulation motor to output the third torque; and
control the booster motor to output the second torque.

8. The brake assistance system of claim 7, further comprising a second displacement sensor configured to detect a displacement of the piston rod, and wherein the control apparatus is further configured to:
obtain, based on the second braking force allocation portion, a displacement value by which the piston rod needs to move; and
control the booster motor to drive the piston rod to move the displacement value when the displacement does not reach the displacement value.

9. The brake assistance system of claim 7, wherein when the booster motor or the simulation motor has failed, the control apparatus is further configured to:
determine, based on the second braking force allocation portion, a fourth torque of a non-failed simulation motor or a non-failed booster motor; and
control the non-failed simulation motor or the non-failed booster motor to output the fourth torque.

10. The brake assistance system of claim 7, wherein the first detection apparatus is a first displacement sensor for detecting a position of the brake pedal, and wherein the control apparatus is further configured to:
obtain a rotation angle of the sun gear based on the position and the second braking force allocation portion; and
obtain a fourth torque of the reset spring to the sun gear based on the rotation angle and an elastic coefficient of the reset spring.

11. The brake assistance system of claim 10, wherein the control apparatus is further configured to:
obtain a first braking force of the brake pedal based on the position and a correspondence between the position and the first braking force; and
further obtain the third torque using the following formulas:

$$T_{b\_trg} = i_1 F_{padel}; \text{ and}$$

$$T_{m\_cmd} = \frac{1}{a}T_{b\_trg} - T_s,$$

wherein $T_{m\_cmd}$ is the third torque, wherein a represents a gear ratio of the ring gear to the sun gear,
wherein $T_s$ is the fourth torque, wherein $T_{b\_trg}$ is the first torque, wherein $F_{padel}$ is the first braking force, and wherein $i_1$ is a speed ratio coefficient of the first gear to the first rack.

12. The brake assistance system of claim 10, wherein the control apparatus is further configured to further obtain the second torque based on the following formulas:

$$T_{c\_trg} = F_{piston\_trg} \cdot i_2; \text{ and}$$

$$T_{a\_FF} = T_{c\_trg} - (a+1)(T_{m\_cmd} + T_s),$$

wherein $F_{piston\_trg}$ is a second braking force of the brake master cylinder, wherein $i_2$ is a speed ratio coefficient of a second gear in the third transmission system to a second rack in the third transmission system, wherein $T_{c\_trg}$ is a fifth torque applied by the brake master cylinder to the planet carrier and wherein $T_{a\_FF}$ is the second torque.

13. A brake method for an electric vehicle comprising:
detecting brake information of the electric vehicle;
obtaining a first torque of a simulation motor in the electric vehicle based on the brake information, wherein the first torque acts on a piston rod in a brake master cylinder in the electric vehicle to move the piston rod;
obtaining a brake requirement of the electric vehicle based on the brake information;
obtaining a battery level of a battery in the electric vehicle;
determining a first braking force allocation portion of a motor in the electric vehicle based on a driving status of the electric vehicle, the brake requirement, and the battery level;
determining a second braking force allocation portion of the brake master cylinder based on the driving status, the brake requirement, and the battery level;
determining a second torque of a booster motor in the electric vehicle based on the first torque and the second braking force allocation portion, wherein the second torque acts on the piston rod to move the piston rod;

controlling the simulation motor to output the first torque; and controlling the booster motor to output the second torque.

14. The brake method of claim 13, further comprising:

further obtaining the brake requirement based on an advanced driver-assistance system (ADAS) in the electric vehicle; or detecting a position of a brake pedal in the electric vehicle, and further obtaining the brake requirement based on the position and a specified correspondence between the position and the brake requirement.

15. The brake method of claim 14, further comprising:

obtaining a first braking force of the brake pedal based on the position and the specified correspondence;

obtaining a rotation angle of a sun gear in the electric vehicle based on the position and the second braking force allocation portion, wherein the sun gear is located in a planetary gear system of a planetary row coupling node in the electric vehicle; and obtaining a third torque of a reset spring in the electric vehicle to the sun gear based on the rotation angle and an elastic coefficient of the reset spring, wherein the planetary row coupling node is configured to convert the first braking force, the third torque, the first torque, and the second torque into an acting force acting on the piston rod.

16. The brake method of claim 15, further comprising further obtaining the first torque based on the following formulas:

$$T_{b\_trg} = i_1 F_{padel};\text{ and}$$

$$T_{m\_cmd} = \frac{1}{a} T_{b\_trg} - T_s,$$

wherein $T_{m\_cmd}$ is the first torque, wherein a represents a gear ratio of a ring gear to the sun gear, wherein $T_s$ is the third torque, wherein $T_{b\_trg}$ is a fourth torque of the brake pedal, brake pedal $F_{padel}$ is the first braking force, wherein $i_1$ is a speed ratio coefficient of the first gear to a first rack in a first transmission system, wherein both the ring gear and the first transmission system are disposed in the planetary row coupling node, wherein the first rack is coupled to the brake pedal, wherein the first gear meshes with the first rack, and wherein the first gear and the ring gear are fixedly coupled and coaxially disposed.

17. The brake method of claim 16, further comprising further obtaining the second torque based on the following formulas:

$$T_{c\_trg} = F_{piston\_trg} \cdot i_2;\text{ and}$$

$$T_{a\_FF} = T_{c\_trg} - (a+1)(T_{m\_cmd} + T_s),$$

wherein $F_{piston\_trg}$ is a second braking force of the brake master cylinder, wherein $i_2$ is a speed ratio coefficient of a second gear to a second rack in a third transmission system, wherein $T_{c\_trg}$ is a fifth torque applied by the brake master cylinder to a planet carrier, wherein $T_{a\_FF}$ is the second torque, wherein both the first transmission system and the planet carrier are disposed in the planetary row coupling node, wherein the second rack is fixedly coupled to the piston rod, wherein the second rack meshes with the second gear, and wherein the second gear and the planet carrier are fixedly coupled and coaxially disposed.

18. The brake method of claim 13, further comprising:

detecting a first displacement value of the piston rod;

obtaining, based on the second braking force allocation portion, a second displacement value by which the piston rod needs to move; and controlling the booster motor to drive the piston rod to move to reach the second displacement value when the first displacement value does not reach the second displacement value.

19. The brake method of claim 13, wherein when the booster motor or the simulation motor has failed, the method further comprises:

determining, based on the second braking force allocation portion, a third torque of a non-failed simulation motor or a non-failed booster motor; and controlling the non-failed simulation motor or the non-failed booster motor to output the third torque.

20. A vehicle, comprising:

a brake assistance system comprising:

a planetary row coupling node;

a brake pedal coupled to the planetary row coupling node and configured to output a first torque;

a booster motor coupled to the planetary row coupling node and configured to output a second torque;

a simulation motor coupled to the planetary row coupling node and configured to output a third torque; and a brake master cylinder coupled to the planetary row coupling node and comprising a piston rod, wherein the planetary row coupling node is configured to convert the first torque, the second torque, and the third torque into an acting force acting on the piston rod, wherein the planetary row coupling node comprises:

a planetary gear system comprising:

a ring gear;

a planet carrier; and a sun gear;

a first transmission system;

a second transmission system; and a third transmission system, wherein the brake pedal, the first transmission system, the ring gear and the planet carrier are sequentially connected, wherein the brake pedal is configured to drive, using the first transmission system and the ring gear, the planet carrier to rotate, wherein the booster motor is configured to drive, using the second transmission system, the planet carrier to rotate, wherein the simulation motor is further coupled to the sun gear and is configured to drive the sun gear to rotate, and wherein the planet carrier is configured to drive, using the third transmission system, the piston rod to move linearly.

* * * * *

UNITED STATES PATENT AND TRADEMARK OFFICE
CERTIFICATE OF CORRECTION

PATENT NO. : 11,400,816 B2  
APPLICATION NO. : 17/339543  
DATED : August 2, 2022  
INVENTOR(S) : Fengyu Liu, Zhuofan Ying and Xiaokang Liu Page 1 of 1

It is certified that error appears in the above-identified patent and that said Letters Patent is hereby corrected as shown below:

In the Claims

Claim 11, Column 26, Line 27: "wherein $T_{m\,cmd}$" should read "wherein $T_{m\_cmd}$"

Claim 12, Column 26, Line 32: "of claim 10" should read "of claim 11"

Signed and Sealed this  
Twenty-seventh Day of September, 2022

Katherine Kelly Vidal  
*Director of the United States Patent and Trademark Office*